(12) United States Patent
Yang et al.

(10) Patent No.: US 12,448,446 B2
(45) Date of Patent: Oct. 21, 2025

(54) CHIMERIC ANTIGEN RECEPTOR AND USE THEREOF

(71) Applicant: SHANGHAI JIAO TONG UNIVERSITY, Shanghai (CN)

(72) Inventors: Xuanming Yang, Shanghai (CN); Yangxin Fu, Shanghai (CN); Fanlin Li, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 1005 days.

(21) Appl. No.: 17/426,548

(22) PCT Filed: Jan. 20, 2020

(86) PCT No.: PCT/CN2020/073304
§ 371 (c)(1),
(2) Date: Jul. 28, 2021

(87) PCT Pub. No.: WO2020/156335
PCT Pub. Date: Aug. 6, 2020

(65) Prior Publication Data
US 2022/0144948 A1  May 12, 2022

(30) Foreign Application Priority Data
Jan. 29, 2019 (CN) .......................... 201910094658.6

(51) Int. Cl.
*C07K 16/28* (2006.01)
*A61K 38/00* (2006.01)
(Continued)

(52) U.S. Cl.
CPC .......... *C07K 16/2809* (2013.01); *A61K 40/11* (2025.01); *A61K 40/31* (2025.01);
(Continued)

(58) Field of Classification Search
CPC ............ C07K 16/2809; C07K 16/2887; C07K 14/7051; C07K 14/70517;
(Continued)

(56) References Cited

U.S. PATENT DOCUMENTS 9,932,402 B2     4/2018  Truneh et al.
2013/0136735 A1  5/2013  Truneh et al.
(Continued)

FOREIGN PATENT DOCUMENTS

CN    101899115 A   12/2010
CN    103945867 A    7/2014
(Continued)

OTHER PUBLICATIONS

Hummer, A.M., et al (2022) Advances in computational structure-based antibody design Current Opinion in Structural Biology 74(102379); 1-7 (Year: 2022).*
(Continued)

*Primary Examiner* — Scarlett Y Goon
*Assistant Examiner* — Audrey L Buttice
(74) *Attorney, Agent, or Firm* — Merchant & Gould P.C.; Daniel J. Pereira

(57) ABSTRACT

A chimeric antigen receptor (CAR) that includes a targeting moiety, a transmembrane domain, a co-stimulatory domain and an intracellular signaling domain, wherein the targeting moiety specifically binds to variable regions Vα and Vβ of a T cell receptor (TCR) and/or fragments thereof.

18 Claims, 7 Drawing Sheets

Specification includes a Sequence Listing.

(51) Int. Cl.
| | |
|---|---|
| *A61K 39/00* | (2006.01) |
| *A61K 40/11* | (2025.01) |
| *A61K 40/31* | (2025.01) |
| *A61K 40/42* | (2025.01) |
| *A61P 35/00* | (2006.01) |
| *C07K 14/705* | (2006.01) |
| *C07K 14/725* | (2006.01) |
| *C12N 5/0783* | (2010.01) |

(52) U.S. Cl.
CPC .......... *A61K 40/4202* (2025.01); *A61P 35/00* (2018.01); *C07K 14/7051* (2013.01); *C07K 14/70517* (2013.01); *C07K 14/70578* (2013.01); *C12N 5/0636* (2013.01); *C12N 5/0646* (2013.01); *A61K 38/00* (2013.01); *A61K 2039/505* (2013.01); *A61K 2239/31* (2023.05); *A61K 2239/38* (2023.05); *A61K 2239/48* (2023.05); *C07K 2317/53* (2013.01); *C07K 2317/565* (2013.01); *C07K 2317/622* (2013.01); *C07K 2317/76* (2013.01); *C07K 2319/02* (2013.01); *C07K 2319/03* (2013.01); *C07K 2319/30* (2013.01); *C07K 2319/33* (2013.01)

(58) Field of Classification Search
CPC .......... C07K 14/70578; C07K 2317/53; C07K 2317/565; C07K 2317/622; C07K 2317/76; C07K 2317/73; C07K 2319/02; C07K 2319/03; C07K 2319/30; C07K 2319/33; A61K 35/17; A61K 38/00; A61K 2039/505; A61K 2039/5156; A61K 2039/5158; A61K 2239/31; A61K 2239/48; A61K 2239/38; A61K 39/4611; A61K 39/4631; A61K 39/464402; A61P 35/00; A61P 35/02; C12N 5/0646; C12N 5/0636; C12N 2510/00
See application file for complete search history.

(56) References Cited

U.S. PATENT DOCUMENTS

| | | | |
|---|---|---|---|
| 2017/0066827 A1 | 3/2017 | Puléet al. | |
| 2017/0320951 A1* | 11/2017 | Genestier | A61K 31/713 |
| 2017/0334998 A1 | 11/2017 | Puléet al. | |
| 2018/0022822 A1 | 1/2018 | Brokopp et al. | |
| 2018/0256716 A1 | 9/2018 | Schendel et al. | |

FOREIGN PATENT DOCUMENTS

| | | | | |
|---|---|---|---|---|
| CN | 106068276 A | 11/2016 | | |
| CN | 108026171 A | 5/2018 | | |
| CN | 109071657 A | 12/2018 | | |
| CN | 109134665 A | 1/2019 | | |
| EP | 3 125 934 B1 * | 3/2015 | ........... | G01N 33/574 |
| EP | 3 241 851 A1 * | 11/2017 | ............. | C07K 19/00 |
| WO | WO-2011016238 A1 * | 2/2011 | ............. | A61P 25/00 |
| WO | WO-2013063395 A1 * | 5/2013 | ....... | A61K 39/39541 |
| WO | WO 2016/174461 A1 | 11/2016 | | |
| WO | WO-2016193301 A1 * | 12/2016 | ....... | A61K 39/39558 |
| WO | WO-2018161017 A1 * | 9/2018 | ........... | A61K 31/505 |
| WO | WO 2018/223601 A1 | 12/2018 | | |

OTHER PUBLICATIONS

Chan, B.M., et al (2018) Flow cytometry-based epitope binning using competitive binding profiles for the characterization of monoclonal antibodies against cellular and soluble protein targets SLAS Discovery 23(7); 613-623 (Year: 2018).*
Chiu, M.L., et al (2019) Antibody structure and function: The basis for engineering therapeutics Antibodies 8(55); 1-80 (Year: 2019).*
International Search Report issued Apr. 20, 2020 in PCT/CN2020/073304 filed Jan. 20, 2020, 4 pages.
Antonio C. Wolff, et al., "Recommendations for Human Epidermal Growth Factor Receptor 2 Testing in Breast Cancer: American Society of Clinical Oncology/College of American Pathologists Clinical Practice Guideline Update," Journal of Clinical Oncology, vol. 31, No. 31, Nov. 1, 2013, 18 Pages.
Paul M. Maciocia, et al., "Targeting the T Cell Receptor B-chain Constant Region for Immunotherapy of T Cell Malignancies," Nature Medicine, Nov. 13, 2017, 12 pages.
Ignazio Caruana, et al., "From Monoclonal Antibodies to Chimeric Antigen Receptors for the Treatment of Human Malignancies," Semin. Oncol., vol. 41, No. 5, Oct. 2014, 11 pages.
Joshua J. Field, et al., "NNKTT120, an Anti-INKT Cell Monoclonal Antibody, Produces Rapid and Sustained INKT Cell Depletion in Adults with Sickle Cell Disease," PLOS One, Feb. 2, 2017, 14 pages.
M. Suzuki, et al., "Prevention of Retrocochlear Hearing Loss in Murine Experimental Allergic Encephalitis with T Cell Receptor Vβ8-specific Antibody," International Congress Series, vol. 1240, 2003, pp. 1169-1173.

* cited by examiner

CHIMERIC ANTIGEN RECEPTOR AND USE THEREOF

CROSS REFERENCE TO RELATED APPLICATIONS

This application is a National Stage Application and claims priority under 35 U.S.C. § 371 to Patent Cooperation Treaty application PCT/CN2020/073304, filed Jan. 20, 2020, which claims the benefit of CN application CN201910094658.6, filed Jan. 29, 2019. Priority is claimed to these applications and the disclosures of these prior applications are considered part of the disclosure of this application and to the extent allowed the entire contents of the aforementioned applications are incorporated herein.

TECHNICAL FIELD

The present application relates to the field of biomedicines, particularly to a chimeric antigen receptor in which a targeting moiety specifically binds to variable regions Vα and Vβ of a T cell receptor (TCR) and fragments thereof.

BACKGROUND OF THE INVENTION

T cell tumors are common malignant blood system diseases. Compared with B cell lymphoma or leukemia, T cell lymphoma or leukemia has poor prognosis. At present, chemotherapy is mainly adopted in the treatment of the T cell lymphoma or leukemia. No specific targeting therapeutic regimen is available so far.

A chimeric antigen receptor T cell (CAR-T cell) is an artificially modified tumor killing cell, which combines a targeting recognition function of an antibody and a tumor killing function of T cells, and is a significant breakthrough in the field of tumor immunotherapy. However, the CAR-T has a side effect of killing normal T cells and poses certain risks for the safety of tumor patients.

Most of the mature T cell tumors express TCR or complexes, most of which are TCR. The group of the whole T cells is extremely heterogeneous, and has various Vα subtypes accounting for 0.85% to 8.3%. Therapies typically for killing tumor cells (for example T cell tumor cells) can also affect normal T cells to a certain extent, thereby causing an adverse impact on an immune system of a patient and hindering the treatment of tumors. Therefore, it is urgent to develop a new CAR having less effect on normal T cell groups.

SUMMARY OF THE INVENTION

The present application provides a chimeric antigen receptor (CAR) and applications thereof. The targeting moiety of the CAR specifically binds to variable regions Vα and Vβ of a T cell receptor (TCR) and/or fragments thereof. The CAR provided by the present application has one or more of the following features: 1) specifically binding to variable regions Vα and Vβ of a T cell receptor (TCR) and/or fragments thereof, 2) selectively killing tumor cells derived from T cells; 3) having less effect on normal T cell groups; and 4) treating T cell lymphoma.

In one aspect, the present application provides a chimeric antigen receptor (CAR), wherein the CAR includes a targeting moiety, a transmembrane domain, a co-stimulatory domain and an intracellular signaling domain, and the targeting moiety specifically binds to variable regions Vα and Vβ of a T cell receptor (TCR) and/or fragments thereof.

In some embodiments, the targeting moiety specifically binds to a variable region Vα of a TCR or a fragment thereof. In some embodiments, the Vα or a fragment thereof includes Vα24 or a fragment thereof. In some embodiments, the Vα or a fragment thereof also includes Jα or a fragment thereof. In some embodiments, the Jα or a fragment thereof includes Jα18 or a fragment thereof.

In some embodiments, the targeting moiety specifically binds to a variable region Vβ of a TCR or a fragment thereof. In some embodiments, the Vβ or a fragment thereof includes Vβ8 or a fragment thereof. In some embodiments, the fragment of the TCR variable region includes CDR3 of the TCR variable region.

In some embodiments, the variable regions Vα and Vβ of a TCR and/or fragments thereof include an amino acid sequence as set forth in any one of SEQ ID NO: 58-61.

In some embodiments, the targeting moiety includes an antibody or a fragment thereof.

In some embodiments, the antibody competes with a reference antibody to bind to the variable regions Vα and Vβ of a TCR and/or fragments thereof, wherein the reference antibody includes a light chain variable region and a heavy chain variable region, the light chain variable region of the reference antibody includes LCDR1, LCDR2 and LCDR3, the LCDR1 includes an amino acid sequence as set forth in any one of SEQ ID NO: 3, SEQ ID NO: 64 and SEQ ID NO: 21; the LCDR2 includes an amino acid sequence as set forth in any one of SEQ ID NO: 4, SEQ ID NO: 65 and SEQ ID NO: 22; the LCDR3 includes an amino acid sequence as set forth in any one of SEQ ID NO: 5, SEQ ID NO: 66 and SEQ ID NO: 23; and the heavy chain variable region of the reference antibody includes HCDR1, HCDR2 and HCDR3, the HCDR1 includes an amino acid sequence as set forth in any one of SEQ ID NO: 11, SEQ ID NO: 67 and SEQ ID NO: 29; the HCDR2 includes an amino acid sequence as set forth in any one of SEQ ID NO: 12, SEQ ID NO: 68 and SEQ ID NO: 30; and the HCDR3 includes an amino acid sequence as set forth in any one of SEQ ID NO: 13, SEQ ID NO: 69 and SEQ ID NO: 31.

In some embodiments, the light chain variable region of the reference antibody includes an amino acid sequence as set forth in any one of SEQ ID NO: 9, SEQ ID NO: 70 and SEQ ID NO: 27; and the heavy chain variable region of the reference antibody includes an amino acid sequence as set forth in any one of SEQ ID NO: 17, SEQ ID NO: 71 and SEQ ID NO: 35.

In some embodiments, the reference antibody includes a Vα24Jα18 antibody.

In some embodiments, the antibody includes a heavy chain complementary determining region 1 (HCDR1), and the HCDR1 includes an amino acid sequence as set forth in any one of SEQ ID NO: 11, SEQ ID NO: 67 and SEQ ID NO: 29. In some embodiments, the antibody also includes a heavy chain complementary determining region 2 (HCDR2), and the HCDR2 includes an amino acid sequence as set forth in any one of SEQ ID NO: 12, SEQ ID NO: 68 and SEQ ID NO: 30. In some embodiments, the antibody also includes a heavy chain complementary determining region 3 (HCDR3), and the HCDR3 includes an amino acid sequence as set forth in any one of SEQ ID NO: 13, SEQ ID NO: 69 and SEQ ID NO: 31.

In some embodiments, the antibody includes a light chain complementary determining region 1 (LCDR1), and the LCDR1 includes an amino acid sequence as set forth in any one of SEQ ID NO: 3, SEQ ID NO: 64 and SEQ ID NO: 21. In some embodiments, the antibody also includes a light chain complementary determining region 2 (LCDR2), and the LCDR2 includes an amino acid sequence as set forth in any one of SEQ ID NO: 4, SEQ ID NO: 65 and SEQ ID NO: 22. In some embodiments, the antibody also includes a light chain complementary determining region 3 (LCDR3), and the LCDR3 includes an amino acid sequence as set forth in any one of SEQ ID NO: 5, SEQ ID NO: 66 and SEQ ID NO: 23.

In some embodiments, the antibody includes a heavy chain variable region, and the heavy chain variable region includes an amino acid sequence as set forth in any one of SEQ ID NO: 17, SEQ ID NO: 71 and SEQ ID NO: 35. In some embodiments, the antibody includes a light chain variable region, and the light chain variable region includes an amino acid sequence as set forth in any one of SEQ ID NO: 9, SEQ ID NO: 70 and SEQ ID NO: 27.

In some embodiments, the antibody is a single-chain antibody.

In some embodiments, the antibody includes an amino acid sequence as set forth in any one of SEQ ID NO: 1, SEQ ID NO: 62 and SEQ ID NO: 19.

In some embodiments, the transmembrane domain includes polypeptides derived or selected from the following proteins: CD8, CD28, CD137 and/or CD3. In some embodiments, the transmembrane domain includes an amino acid sequence as set forth in SEQ ID NO: 40.

In some embodiments, the co-stimulatory domain includes polypeptides derived or selected from the following proteins: ICOS, CD28, CD27, HVEM, LIGHT, CD40L, 4-1BB, OX40, DR3, GITR, CD30, TIM1, SLAM, CD2 and/or CD226. In some embodiments, the co-stimulatory domain includes an amino acid sequence as set forth in SEQ ID NO: 42.

In some embodiments, the intracellular signaling domain includes a polypeptide from CD3ζ. In some embodiments, the intracellular signaling domain includes an amino acid sequence as set forth in SEQ ID NO: 44.

In some embodiments, the CAR also includes a hinge region, and the hinge region connects the antibody and the transmembrane domain. In some embodiments, the hinge region includes polypeptides selected from the following proteins: CD8a and/or IgG In some embodiments, the hinge region includes an amino acid sequence as set forth in SEQ ID NO: 38.

In some embodiments, the CAR includes an amino acid sequence as set forth in any one of SEQ ID NO: 46, SEQ ID NO: 72 and SEQ ID NO: 50.

In another aspect, the present application provides an isolated nucleic acid molecule encoding CAR of the present application.

In another aspect, the present application provides an isolated nucleic acid molecule encoding CAR, including a nucleic acid sequence as set forth in any one of SEQ ID NO: 47, SEQ ID NO: 73 or SEQ ID NO: 51.

In another aspect, the present application provides a vector, including a nucleic acid molecule of the present application. In some embodiments, the vector of the present application includes an mRNA vector, a plasmid vector, a retroviral vector and/or a lentiviral vector.

In another aspect, the present application provides an immunologic effector cell including or expressing the CAR of the present application, the nucleic acid molecule of the present application, or the vector of the present application. In some embodiments, the immunologic effector cell is selected from T lymphocytes and natural killing (NK) cells. In some embodiments, the T lymphocytes and/or the natural killing cells are of a natural origin or induced by stem cells.

In another aspect, the present application provides a method for preparing an immunologic effector cell, including introducing the vector of the present application into the immunologic effector cell.

In another aspect, the present application provides a composition including the immunologic effector cell of the present application.

In another aspect, the present application provides applications of the CAR of the present application, the nucleic acid molecule of the present application, the vector of the present application or the use of immunologic effector cell in preparation of a drug of the present application, wherein the drug is used for treating T cell lymphoma or leukemia.

In some embodiments, the T cell lymphoma or leukemia includes one or more selected from the following group: peripheral T-cell lymphoma, non-specific peripheral T-cell lymphoma, vascular immunoblastic lymphoma, extranodal NKT-cell lymphoma, anaplastic T-cell lymphoma, ALK positive anaplastic cell lymphoma, ALK negative anaplastic cell lymphoma, T-lymphoblastic lymphoma, cytotoxic T-cell lymphoma, cutaneous T-cell lymphoma, adult T-cell leukemia/lymphoma (ATLL) T-prolymphocyte leukemia (T-PLL), T-large granular lymphocytic leukemia (T-LGL), hepatosplenic T-cell lymphoma (HSTL), sezary syndrome (SS), subcutaneous tonsil-like T-cell lymphoma and unclassified T-cell lymphoma.

Those skilled in the art can easily and thoroughly understand other aspects and advantages of the present disclosure from the detailed descriptions below. The detailed descriptions below only show and describe exemplary embodiments of the present disclosure. Those skilled in the art will realize that the contents of the present disclosure enable those skilled in the art to make changes to the disclosed specific embodiments without departing from the spirit and scope of the present application. Correspondingly, the drawings and specification description of the present application are only exemplary rather than limiting.

BRIEF DESCRIPTION OF THE DRAWINGS

Specific features of the invention involved in the present application are shown in the appended claims. By reference to exemplary embodiments and drawings described in detail below, the features and advantages of the invention involved in the present application will be better understood. The drawings will be described below:

DETAILED DESCRIPTION OF THE EMBODIMENTS

Figure 1:
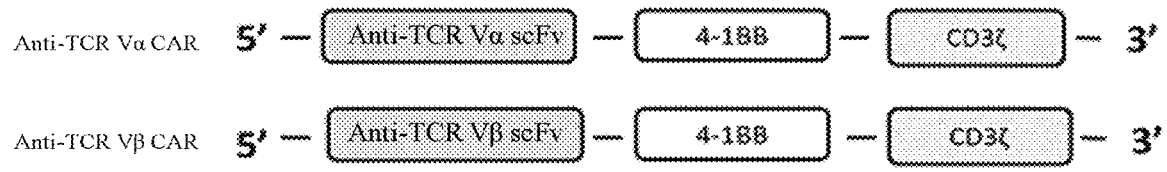
FIG. 1 shows a structural schematic diagram of a CAR targeting TCR Vα or Vβ subtype in the present application.

The embodiments of the invention involved in the present application will be described by the following specific embodiments. Those skilled in the art can easily know other advantages and effects of the invention involved in the present application according to the contents disclosed in the present specification. The present application provides a CAR capable of specifically binding to the variable regions Vα and Vβ of a T cell receptor and/or fragments thereof, which can selectively kill tumor cells derived from T cells and has small effects on normal T cell popularizations.

The present invention will be further described below: in the present invention, unless otherwise stated, scientific and technical terms used herein have meanings generally understood by those skilled in the art. Furthermore, proteins as well as nucleic acid chemistry, molecular biology, cell and tissue culture, microbiology and immunology related terms and lab operating steps used herein are all terms and conventional steps widely used in the corresponding fields. Meanwhile, in order to better understand the present invention, definitions and explanations of relevant terms will be provided now.

In the present application, the "chimeric antigen receptor" (Chimeric Antigen Receptor, CAR) typically refers to a fused protein including an extracellular domain capable of binding to an antigen and at least one intracellular domain. The CAR is a core component of a chimeric antigen receptor T cell (CAR-T), which may include a tumor-associated antigen (tumor-associated antigen, TAA) binding region, a transmembrane domain, a co-stimulatory domain and an intracellular signaling domain. In some embodiments, the intracellular domain and the transmembrane domain may be derived from different proteins.

In the present application, the "targeting moiety" typically refers to any oligopeptide or polypeptide which can specifically bind to a target protein or a fragment thereof in the chimeric antigen receptor. In the present application, the targeting moiety may be an antigen binding region, for example, an antigen binding moiety of an antibody. In some embodiments, the targeting moiety may include a single-chain antibody (scFv) or a portion thereof specifically recognizing a target protein (for example an antigen). In the present application, the targeting moiety may be a tumor-associated antigen binding region. In the present application, the tumor-associated antigen may have antigenicity and express a tumor-associated biomolecule. For example, the tumor-associated antigen may include a tumor-specific antigen of an antigen which can be only present in tumor cells rather than in other normal cells; and may also include an antigen which can be not only present in tumor cells but also in other organs and tissues or heterogeneous and allogeneic normal cells, or an antigen expressed in the processes of development and differentiation.

In the present application, the "transmembrane domain" (Transmembrane Domain) typically refers to a domain stretching across the cell membrane. For example, the transmembrane domain may be the domain of the chimeric antigen receptor stretching across the cell membrane. In the present application, the transmembrane domain may be derived from natural polypeptides, or obtained by artificial design. For example, the transmembrane domain may be a transmembrane domain derived or selected from the following proteins: a T cell receptor α or β chain, a 3ζ chain, CD16, CD22, CD33, CD37, CD64, CD80, CD86, CD134, CD137, ICOS, CD154 or GITR.

In the present application, the "co-stimulatory domain" typically refers to an intracellular domain which can provide an immune co-stimulatory molecule. The co-stimulatory molecule may be a molecule required for an effective response of lymphocytes to an antigen. The co-stimulatory domain may include a co-stimulatory domain of CD28. The co-stimulatory domain may include a co-stimulatory domain of a TNF receptor family, for example co-stimulatory domains of OX40 and 4-1BB.

In the present application, the "intracellular signaling domain" typically refers to a domain located inside the cell and capable of transducing signals. In the present application, the intracellular signaling domain can transduce signals to cells. For example, the intracellular signaling domain is an intracellular signaling domain of the chimeric antigen receptor. For example, the intracellular signaling domain may be an intracellular domain derived or selected from CD3ζ, CD28, 4-1BB or OX40. Again, for example, the intracellular signaling domain can be an intracellular domain derived from GITR.

In the present application, the "T cell receptor (TCR)" typically refers to a specific receptor on the surface of the T cell. The T cell receptor is a heterodimer, and may be composed of two different subunits. Most of the T cell receptors (for example, 95% or more, 96% or more, 97% or more, etc.) are composed of α subunits and β subunits, and each peptide chain may also be divided into a variable region (V region), a constant region (C region), a transmembrane region, a cytoplasmic region and other parts. In some embodiments, the T cell receptor may be composed of γ subunits and δ subunits, and the ratio of the two subunits varies with individual development or diseases.

In the present application, the "TCR variable region" typically refers to V regions of α and β peptide chains of TCR, namely, Vα and Vβ. The Vα and Vβ can have antigen specificity. The Vα and Vβ may each have three hypervariable regions CDR1, CDR2 and CDR3, wherein the change degree of the CDR3 of the TCR variable region is the biggest, and the CDR3 of the TCR variable region can determine the antigen binding specificity of TCR.

In the present application, the "Vα" typically refers to the variable region of the α chain of TCR. This term may also include a Vα full-length sequence and/or a Vα functional fragment, as long as it can be recognized by an antibody that can be targeted. For example, the Vα of the present application may be the Vα with a registration number of Gene ID 6955 (human origin) and Vα with a registration number of Gene ID 21473 (mouse origin) in GenBank. In the present application, the "Vα24" typically refers to a variant of a Vα fragment. The Vα24 may be derived from different germ lines such as human beings, macaques, mice or rats. For example, the Vα24 may be of macaque origin, and has a registration number of ABG76794.1 in GenBank; or may be of a human origin, and has a PDB number of 4EN3_A.

In the present application, the "Jα" typically refers to a Jα fragment of the variable region of the α chain of a TCR, which may have multiple variants. The Jα may be Jβ18. In the present application, the "Jα18" typically refers to a variant of a Jα fragment. The Jα18 may be derived from different germ lines such as human beings, macaques, mice or rats. For example, the Jα18 of the present application may be of a human origin and has a sequence as set forth in SEQ ID NO: 58.

In the present application, the "Vα24Jα18" typically refers to a variant obtained by recombining the variant Vα24 of Vα with the variant Jα18 of the Jα fragment. For example, the sequence of the Vα24Jα18 of the present application may be as set forth in SEQ ID NO: 59.

In the present application, the "Vβ" typically refers to a variable region of a β chain of a TCR. This term may also include a Vβ full-length sequence and/or a Vβ functional fragment, as long as it can be recognized by an antibody that can be targeted. For example, the Vβ of the present application may be the Vβ with a registration number of Gene ID 6957 (human origin) and Vβ with a registration number of Gene ID 21577 (mouse origin) in GenBank.

In the present application, the "Vβ8" typically refers to a variant of a variable region of a β chain of a TCR. For example, the Vβ8 of the present application may be derived from different germ lines such as human beings, macaques, mice or rats. For example, the Vβ8 of the present application may be of a human origin and has a sequence as set forth in SEQ ID NO: 61; or may be of mouse origin and has a sequence as set forth in SEQ ID NO: 60.

In the present application, the "variant" typically refers to a protein or polypeptide obtained by substitution, deletion or addition of one or more amino acids in the amino acid sequence of the protein and/or polypeptide (for example, an antibody or a fragment thereof specifically binding to the TCR variable region). For example, the functional variant may include a protein or polypeptide with changes in amino acid due to substitutions, deletions and/or insertions of at least 1 amino acid, such as 1-30, 1-20 or 1-10 amino acids, or such as 1, 2, 3, 4 or 5 amino acids. The functional variant may basically maintain biological characteristics of the protein or polypeptide before change (for example substitution, deletion or addition). For example, the functional variant may maintain at least 60%, 70%, 80%, 90% or 100% biological characteristics (for example antigen binding capability) of the protein or polypeptide before change. For example, the substitution may be conservative substitution.

In the present application, the "homolog" typically refers to a protein or polypeptide having at least about 85% (for example, at least about 85%, about 90%, about 91%, about 92%, about 93%, about 94%, about 95%, about 96%, about 97%, about 98%, about 99% or more) sequence identity to the amino acid sequence of the protein and/or polypeptide (for example, antibody or a fragment thereof specifically binding to the TCR variable region).

In the present application, the homology typically refers to similarity or analogy or correlation between two or more sequences. "Sequence homology percentage" may be calculated according to the following manner: two sequences to be aligned are compared in a comparative window to determine the number of the positions of the same nucleic acid basic groups (for example, A, T, C and G) or the same amino acid residues (for example, Ala, Pro, Ser, Thr, Gly, Val, Leu, Ile, Phe, Tyr, Trp, Lys, Arg, His, Asp, Glu, Asn, Gln, Cys and Met) present in the two sequences to obtain the number of the matched positions, the number of the matched positions is divided by the total number of positions in the comparative window (i.e., window size), and the result is multiplied by 100 to obtain the sequence homology percentage. Alignment performed for the purpose of determining the sequence homology percentage may be implemented according to many manners known in the art, for example, publically acquired computer software, such as BLAST, BLAST-2, ALIGN or Megalign (DNASTAR) software, can be used. Those skilled in the art can determine appropriate parameters for sequence alignment, including any algorithms required for achieving the biggest alignment within a full-sequence range or target sequence region being compared. The homology may also be measured through the following methods: FASTA and BLAST. For the description of FASTA algorithm, please refer to *Improved Tool for Biological Sequence Alignment* by W. R. Pearson and D. J. Lipman, Proceedings of the National Academy of Sciences of the United States of Anerica (Proc. Natl. Acad. Sci.)., 85: 2444-2448, 1988; and *Rapid and Sensitive Protein Similarity Search* by D. J. Lipman and W. R. Pearson, Science, 227: 1435-1441, 1989. For the description of BLAST algorithm, please refer to *Basic Local Alignment Search Tool* by S. Altschul, W. Gish, W. Miller, E. W. Myers and D. Lipman, Journal of Molecular Biology, 215: 403-410, 1990.

In the present application, the "CDR3 of a TCR variable region" typically refers to a complementary determining region 3 of a TCRβ chain. The CDR3 of the TCR variable region may be a site directly binding to an antigen peptide. The gene of the CDR3 of the TCR variable region may be composed of a V terminal, a D fragment, a J front end and an insertion sequence (VnDnJ) between rearrangement V-D and D-J.

In the present application, the "Vα24Jα18 antibody" typically refers to an antibody specifically binding to Vα24Jα18. For example, in the present application, the Vα24Jα18 antibody may be 6B11 (Invitrogen Product #25-5806-41). For example, in the present application, the Vα24Jα18 antibody may be scFv T120 (its sequence may be for example as set forth in SEQ ID NO: 1).

In the present application, the "Vβ8 antibody" typically refers to an antibody specifically binding to Vβ8. For example, in the present application, the Vβ antibody may be scFv F231 (its sequence may be for example as set forth in SEQ ID NO: 19). Again, for example, in the present application, the Vβ antibody may be scFv 1168 (its amino acid sequence may be for example as set forth in SEQ ID NO: 62, and its nucleic acid sequence may be for example as set forth in SEQ ID NO: 63).

In the present application, the "antibody" typically refers to a polypeptide molecule capable of specifically recognizing and/or neutralizing a specific antigen. For example, the antibody may include an immune globulin consisting of at least two heavy (H) chains and two light (L) chains mutually connected through a disulfide bond, and include any molecule including its antigen binding portion. The term "antibody" includes a monoclonal antibody, an antibody fragment or an antibody derivative, including but not limited to a human antibody, a humanized antibody, a chimeric antibody, a single-domain antibody (e.g., dAb), a single-chain antibody (e.g., scFv), and an antigen-binding antibody fragment (e.g., Fab, Fab' and (Fab)$_2$ fragments). The term "antibody" also includes all the recombinant forms of the antibody, for example antibodies expressed in prokaryotic cells, unglycosylated antibodies and any antigen-binding antibody fragments and derivatives thereof. Each heavy chain may be composed of a heavy chain variable region (VH) and a heavy chain constant region (CH). Each light chain may be composed of a light chain variable region (VL) and a light chain constant region (CL). VH and VL regions may be further differentiated into hypervariable regions called complementary determining regions (CDR), which are distributed in a more conservative region called a framework region (FR). Each VH and VL may be composed of three CDR regions and four FR regions, which may be arranged from an amino terminal to a carboxyl terminal in the following sequence: FR1, CDR1, FR2, CDR2, FR3, CDR3 and FR4. The variable regions of the heavy chain and the light chain contain binding domains interacting with the antigens. The constant region of the antibody may mediate the binding of the immune globulin to a host tissue or a factor, the host tissue or the factor includes multiple cells (for example, effector cells) of the immune system and a first component (C1q) of a typical complement system.

In the present application, the "nucleic acid molecule" typically refers to any length of isolated nucleotides or deoxyribonucleotides or ribonucleotides or analogues thereof isolated from natural environment or artificially synthesized. The nucleic acid molecule of the present application may be isolated. For example, the nucleic acid molecule may be produced or synthesized by the following method: (i) in-vitro amplification, for example polymerase chain reaction (PCR) amplification; (ii) clone recombination; (iii) purification, for example digestion and gel electrophoresis classification isolation; or (iv) synthesis, for example chemical synthesis. In some embodiments, the isolated nucleic acid is a nucleic acid molecule prepared by a recombinant DNA technology. In the present application, the nucleic acid encoding the antibody or antigen-binding fragment thereof may be prepared by many methods known in the art, these methods include but are not limited to overlap extension PCR using restrictive fragment operation or synthesized oligonucleotides, and for specific operations, please refer to *Molecular Cloning*, by Sambrook et al., A Laboratory Manual, Cold Spring Harbor Laboratory Press, Cold Spring Harbor, N.Y., 1989; and *Current Protocols in Molecular Biology*, by Ausube et al., Greene Publishing and Wiley-Interscience, New York N.Y., 1993.

In the present application, the "vector" typically refers to a nucleic acid molecule capable of being self replicated in a proper host to transfer the inserted nucleic acid molecule into a host cell and/or between host cells. The vector may include a vector mainly used for inserting DNA or RNA into a cell, a vector mainly used for replicating DNA or RNA and an expressed vector mainly used for transcription and/or translation of DNA or RNA. The vector also includes a vector having multiple functions described above. The vector may be a polynucleotide which may be transcribed and translated into a polypeptide when being introduced into a proper host cell. Typically, the vector may produce an expected expression product by culturing the proper host cell including the vector. In the present application, the vector may include one or more of the nucleic acid molecules. In addition, the vector may also include other genes, for example marker genes allowing selecting this vector in the proper host cell and under the appropriate condition. In addition, the vector may also include an expression control element allowing an encoding region to be correctly expressed in the proper host cell. Such a control element is well known by those skilled in the art. For example, a promoter, a ribosome binding site, an enhancer and other control elements regulating gene transcription or mRNA translation are included. In some embodiments, the expression control sequence is an adjustable element. The specific structure of the expression control sequence may vary depending on functions of species or cell types, but typically includes 5' non-transcription sequence and 5' and 3' non-translation sequences participating in transcription and translation initiation respectively, for example a TATA box, a capping sequence and a CAAT sequence, etc. For example, the 5' non-transcription expression control sequence may include a promoter region, and the promoter region includes a promoter sequence for transcriptional control of a functionally linked nucleic acid.

In the present application, the "mRNA vector" typically refers to an mRNA fragment expressing an exogenous gene or a self gene in a host cell. For example, in the present application, the mRNA vector may include F231mBBZ mRNA and 20mBBZ mRNA.

In the present application, the "plasmid vector" typically refers to a plasmid artificially constructed to adapt to lab operations on the basis of natural plasmids. Compared with the natural plasmid, the vector plasmid typically has one or more selective marker genes (such as an antibiotic resistance gene) and one artificially synthesized multi-cloning site sequence containing multiple restrictive endonucleases recognition sites, and most of the unnecessary sequences are removed to reduce the molecular weight as far as possible, so as to facilitate genetic engineering operations.

In the present application, the "retroviral vector" typically refers to one of RNA viruses, its genetic information is stored on ribonucleic acid, and most of such viruses have reverse transcriptase. The retrovirus at least contains three genes: gag, a gene including a protein making up a center and a structure of a virus; pol, a gene including reverse transcriptase; and env, a gene including a viral coat. Through retroviral transfection, the retroviral vector may randomly and stably integrate a self genome and its carried exogenous gene into a host cell genome, for example, a CAR molecule may be integrated into the host cell.

In the present application, the "lentiviral vector" typically refers to a diploid RNA viral vector belonging to retroviruses. The lentiviral vector is a vector prepared by using a genome of a lentivirus as a basis, removing multiple sequence structures associated with viral activity so as to have biological safety, and then introducing a sequence of a target gene required by experiments and an expression structure to this genome framework. Compared with other retroviruses, the lentiviral vector has wider hosts, has an infection capability on both cleavage cells and non-cleavage cells, and may greatly improve the transduction efficiency of the target gene for some difficultly transfected cells, such as primary cells, stem cells and undifferentiated cells (please refer to *Lentiviral Vector and Its Research Progress*, by Chen Chen and Wan Haisu, Chinese Journal of Lung Cancer 17.12 (2014): 870-876. PMC). Through transfection of the lentiviral vector, the retroviral vector may randomly and stably integrate a self genome and its carried exogenous gene into the host cell genome, for example, the CAR molecule may be integrated into the host cell.

In the present application, the "immunologic effector cell" typically refers to an immune cell participating in removing foreign antigens and exerting an effect function in immune response, for example, plasma cells, cytotoxic T cells, NK cells, APSC pluripotent cells and mast cells, etc.

In the present application, the term "pharmaceutically acceptable adjuvant" typically refers to a pharmaceutically acceptable preparation carrier, solution or additive that enhances the characteristics of the preparation. Such additives are well known by those skilled in the art.

In the present application, "T cell lymphoma" typically refers to lymphoma affecting T cells. The T cell lymphoma may include the following types: angiocentric lymphoma (Angiocentric lymphoma), cutaneous T cell lymphoma (Cutaneous T cell lymphoma), anaplastic large-cell lymphoma (Anaplastic large-cell lymphoma) and angioimmunoblastic T-cell lymphoma (Angioimmunoblastic T-cell lymphoma). The T cell lymphoma may be developed in lymphatic tissues, such as in lymph nodes and spleen or outside the lymphatic tissues (i.e., gastrointestinal tract, liver, nasal cavity, skin, etc).

In the present application, "leukemia" typically refers to a broad definition of blood cell cancers. For example, the leukemia may be a disease caused by proliferation and accumulation of a large number of leukemia cells. The leukemia typically starts from bone marrow. In the present application, the types of leukemia may depend on types of blood cells becoming cancer and/or growth speed of this blood cell. For example, the leukemia may include adult T cell leukemia/lymphoma (ATLL), T prolymphocytic leukemia (T-PLL), T large particle lymphocyte (T-LGL) leukemia and other subtypes.

In the present application, the "natural origin" typically refers to an acquiring manner of a wild type that is not artificially processed. In the present application, the natural origin may be a manner for acquiring cells directly collected from a donor. For example, it may be a manner for acquiring cells which are not subjected to artificial gene edition or modification. In the present application, the donor may be a healthy mammal or a mammal with a disease, such as human beings, mice and monkeys, etc. In the present application, the disease may refer to cancer. For example, the disease may be T cell-derived leukemia or lymphoma (for example, T cell lymphoma).

In the present application, the "induced by stem cells" typically refers to a process in which stem cells are differentiated through artificial induction in vitro. In the present application, an in-vitro induction method typically includes addition of an inducing factor into in-vitro cultured adult stem cells, and the inducing factor may include various substances capable of affecting cell differentiation, such as serum, sugar, vitamins, and various protein factors, etc. In the present application, the stem cells may be induced into induced pluripotent stem cells (induced pluripotent stem cells, iPS cells) via stem cell induction. The induced pluripotent stem cells may be obtained by transferring a combination of four transcription factors (Oct4, Sox2, Klf4 and c-Myc) into somatic cells using viral vectors. In the present application, the iPS cell may be one cell type similar to an embryonic stem cell and an embryonic APSC pleuripotent cell.

In the present application, the "and/or" should be understood as any one or two of options.

In the present application, the term "about" typically refers to a change within a range of 0.5%-10% above or below a designated value, for example a change within a range of 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% or 10% above or below a designated value.

In the present application, the term "include" typically refers to including, summarizing, containing or including. In some cases, it also represents "is . . . " and "consisting of . . . ".

1. Chimeric Antigen Receptor

In the present application, the chimeric antigen receptor (CAR) may include a targeting moiety, a transmembrane domain, a co-stimulatory domain and an intracellular signaling domain, wherein the targeting moiety may specifically bind to variable regions Vα and Vβ of a T cell receptor (TCR) and/or fragments thereof.

a. Targeting Moiety

In some embodiments, the targeting moiety may specifically bind to the variable region Vα of a TCR or a fragment thereof. In some embodiments, the Vα or a fragment thereof may include Vα24 or a fragment thereof. In some embodiments, the Vα or a fragment thereof may also include Jα or a fragment thereof. In some embodiments, the Jα or a fragment thereof may include Jα18 or a fragment thereof. In some embodiments, the targeting moiety may include a moiety targeting Vα24Jα18. In the present application, the moiety targeting Vα24Jα18 includes scFv T120 whose sequence is as set forth in SEQ ID NO: 1.

In some embodiments, the targeting moiety specifically binds to the variable region Vβ of a TCR or a fragment thereof. In some embodiments, the Vβ or a fragment thereof may include Vβ8 or a fragment thereof. In some embodiments, the fragment of the TCR variable region may include CDR3 of the TCR variable region. In some embodiments, the targeting moiety may include a moiety targeting Vβ8. In the present application, the moiety targeting Vβ8 may include scFv F231 whose sequence is as set forth in SEQ ID NO: 19. Again, for example, in the present application, the moiety targeting Vβ8 may also include scFv 1168 whose sequence is as set forth in SEQ ID NO: 62.

In the present application, the variable regions Vα and Vβ of a TCR or fragments thereof may include an amino acid sequence as set forth in SEQ ID NO: 58-61, Gene ID 21473, Gene ID 6955, Gene ID 21577 and Gene ID 6957.

In the present application, the targeting moiety may include an antibody or a fragment thereof.

In the present application, the antibody may compete with a reference antibody to bind to the variable regions Vα and Vβ of a TCR and/or fragments thereof, wherein the reference antibody may include a light chain variable region and a heavy chain variable region, the light chain variable region of the reference antibody may include LCDR1, LCDR2 and LCDR3, the LCDR1 may include an amino acid sequence as set forth in any one of SEQ ID NO: 3, SEQ ID NO: 64 and SEQ ID NO: 21; the LCDR2 may include an amino acid sequence as set forth in any one of SEQ ID NO: 4, SEQ ID NO: 65 and SEQ ID NO: 22; the LCDR3 may include an amino acid sequence as set forth in any one of SEQ ID NO: 5, SEQ ID NO: 66 and SEQ ID NO: 23; the heavy chain variable region of the reference antibody may include HCDR1, HCDR2 and HCDR3, the HCDR1 may include an amino acid sequence as set forth in any one of SEQ ID NO: 11, SEQ ID NO: 67 and SEQ ID NO: 29; the HCDR2 may include an amino acid sequence as set forth in any one of SEQ ID NO: 12, SEQ ID NO: 68 and SEQ ID NO: 30; and the HCDR3 may include an amino acid sequence as set forth in any one of SEQ ID NO: 13, SEQ ID NO: 69 and SEQ ID NO: 31.

In the present application, the light chain variable region of the reference antibody may include an amino acid sequence as set forth in any one of SEQ ID NO: 9, SEQ ID NO: 70 and SEQ ID NO: 27; and the heavy chain variable region of the reference antibody may include an amino acid sequence as set forth in any one of SEQ ID NO: 17, SEQ ID NO: 71 and SEQ ID NO: 35.

In the present application, the reference antibody may include a Vα24Jα18 antibody. For example, the Vα24Jα18 antibody may be scFv T120 whose sequence is as set forth in SEQ ID NO: 1.

In the present application, the antibody may include a heavy chain complementary determining region 1 (HCDR1), and the HCDR1 includes an amino acid sequence as set forth in any one of SEQ ID NO: 11, SEQ ID NO: 67 and SEQ ID NO: 29. In the present application, the antibody may also include a heavy chain complementary determining region 2 (HCDR2), and the HCDR2 includes an amino acid sequence as set forth in any one of SEQ ID NO: 12, SEQ ID NO: 68 and SEQ ID NO: 30. In the present application, the antibody may also include a heavy chain complementary determining region 3 (HCDR3), and the HCDR3 includes an amino acid sequence as set forth in any one of SEQ ID NO: 13, SEQ ID NO: 69 and SEQ ID NO: 31.

In the present application, the antibody may include a light chain complementary determining region 1 (LCDR1), and the LCDR1 includes an amino acid sequence as set forth in any one of SEQ ID NO: 3, SEQ ID NO: 64 and SEQ ID NO: 21. In the present application, the antibody may also include a light chain complementary determining region 2 (LCDR2), and the LCDR2 includes an amino acid sequence as set forth in any one of SEQ ID NO: 4, SEQ ID NO: 65 and SEQ ID NO: 22. In the present application, the antibody may also include a light chain complementary determining region 3 (LCDR3), and the LCDR3 includes an amino acid sequence as set forth in any one of SEQ ID NO: 5, SEQ ID NO: 66 and SEQ ID NO: 23.

In the present application, the antibody may include a heavy chain variable region, and the heavy chain variable region includes an amino acid sequence as set forth in any one of SEQ ID NO: 17, SEQ ID NO: 71 and SEQ ID NO: 35. In the present application, the antibody may include a light chain variable region, and the light chain variable region includes an amino acid sequence as set forth in any one of SEQ ID NO: 9, SEQ ID NO: 70 and SEQ ID NO: 27.

In the present application, the antibody may be a single-chain antibody (scFv). In the present application, the single-chain antibody may include one or more scFv which are connected. For example, the single-chain antibody may include one scFv, and the single-chain antibody may include more than one scFv (such as 2, 3, 4 and 5, etc). In some embodiments, multiple scFv may be directly connected. In some embodiments, the multiple scFv may be connected via a linker peptide.

For example, the single-chain antibody may include scFv T120 whose sequence is as set forth in SEQ ID NO: 1; it may include a light chain variable region whose sequence is as set forth in SEQ ID NO: 9; it may include LCDR1-3 whose sequences are as set forth in SEQ ID NO: 3-5 respectively; it may include a heavy chain variable region whose sequence is as set forth in SEQ ID NO: 17; it may include HCDR1-3 whose sequences are as set forth in SEQ ID NO: 11-13 respectively; and it may include a linker peptide of VL and VH, and the linker peptide has a sequence as set forth in SEQ ID NO: 52.

For example, the single-chain antibody may include scFv F231 whose sequence is as set forth in SEQ ID NO: 19; it may include a light chain variable region whose sequence is as set forth in SEQ ID NO: 27; it may include LCDR1-3 whose sequences are as set forth in SEQ ID NO: 21-23 respectively; it may include a heavy chain variable region whose sequence is as set forth in SEQ ID NO: 35; it may include HCDR1-3 whose sequences are as set forth in SEQ ID NO: 29-31 respectively; and it may include a linker peptide of VL and VH, and the linker peptide has a sequence as set forth in SEQ ID NO: 52.

For example, the single-chain antibody may include scFv1168 whose sequence is as set forth in SEQ ID NO: 62; it may include a light chain variable region whose sequence is as set forth in SEQ ID NO: 70; it may include LCDR1-3 whose sequences are as set forth in SEQ ID NO: 64-66 respectively; it may include a heavy chain variable region whose sequence is as set forth in SEQ ID NO: 71; it may include HCDR1-3 whose sequences are as set forth in SEQ ID NO: 67-69 respectively; and it may include a linker peptide of VL and VH, and the linker peptide has a sequence as set forth in SEQ ID NO: 52 b. Transmembrane Domain

In the present application, the transmembrane domain may include transmembrane domains derived or selected from the following proteins: CD8, CD28, CD137 and/or CD3. In the present application, the transmembrane domain may include an amino acid sequence as set forth in SEQ ID NO: 40. For example, in the present application, the transmembrane domain may be a CD8 transmembrane region whose sequence is as set forth in SEQ ID NO: 40. In the present application, CAR T120BBZ and CAR 1168BBZ may include a transmembrane domain of CD8.

c. Co-Stimulatory Domain

In the present application, the co-stimulatory domain may include co-stimulatory domain domains selected from the following proteins: ICOS, CD28, CD27, HVEM, LIGHT, CD40L, 4-1BB, OX40, DR3, GITR, CD30, TIM1, SLAM, CD2 and/or CD226. In the present application, the co-stimulatory domain may include an amino acid sequence as set forth in SEQ ID NO: 42. For example, in the present application, the co-stimulatory domain may be 4-1BB whose sequence is as set forth in SEQ ID NO: 42. In the present application, CAR T120BBZ, CAR 1168BBZ and CAR F231mBBZ may include a transmembrane domain of 4-1BB.

d. Signaling Domain

In the present application, the intracellular signaling domain may include a signaling domain from CD3ζ. In the present application, the intracellular signaling domain may include an amino acid sequence as set forth in SEQ ID NO: 44. For example, in the present application, the signaling domain may be CD3ζ whose sequence is as set forth in SEQ ID NO: 44. In the present application, CAR T120BBZ, CAR 1168BBZ and CAR F231mBBZ may include a signaling domain of CD3ζ.

e. Hinge Region

In the present application, the CAR may also include a hinge region, and the hinge region can connect the antibody and the transmembrane domain. In the present application, the hinge region may include a hinge region from the following proteins selected from CD8a and/or IgG. In the present application, the hinge region is CD8a which may include an amino acid sequence as set forth in SEQ ID NO: 38. For example, in the present application, the hinge region may be CD8a with a sequence as set forth in SEQ ID NO: 38. In the present application, CAR T120BBZ, CAR 1168BBZ and CAR F231mBBZ may include a hinge region of CD8a.

f. CAR

The CAR of the present application may include an amino acid sequence as set forth in any one of SEQ ID NO: 46, SEQ ID NO: 64 and SEQ ID NO: 50. For example, the CAR may be selected from CAR T120BBZ whose sequence is as set forth in SEQ ID NO: 46. Again, for example, the CAR may be selected from CAR F231mBBZ whose sequence is as set forth in SEQ ID NO: 50. Again, for example, the CAR may be selected from CAR 1168BBZ whose sequence is as set forth in SEQ ID NO: 72.

In some embodiments, the CAR of the present application may successively include a targeting moiety (the sequences of the targeting moiety are as set forth in SEQ ID NO: 1 and SEQ ID NO: 19), a transmembrane domain (the sequence of the transmembrane domain is as set forth in SEQ ID NO: 40), a co-stimulatory domain (the sequence of the co-stimulatory domain is as set forth in SEQ ID NO: 42) and an intracellular signaling domain (the sequence of the intracellular signaling domain is as set forth in SEQ ID NO: 44) starting from an N terminal.

For example, the CAR of the present application may be CAR T120BBZ whose targeting moiety is scFv T120, and an amino acid sequence of scFv T120 is as set forth in SEQ ID NO: 46. Its transmembrane domain is CD8a with an amino acid sequence as set forth in SEQ ID NO: 40. The co-stimulatory domain may be 4-1BB with an amino acid sequence as set forth in SEQ ID NO: 42. The intracellular signaling domain may be CD3ζ with an amino acid sequence as set forth in SEQ ID NO: 44. The amino acid sequence of CAR T120BBZ is as set forth in SEQ ID NO: 46.

For example, the CAR of the present application may be CAR F231mBBZ whose targeting moiety is scFv F231, and the amino acid sequence of scFv F231 is as set forth in SEQ ID NO: 19. The transmembrane domain is CD8a with an amino acid sequence as set forth in SEQ ID NO: 40. The co-stimulatory domain may be 4-1BB with an amino acid sequence as set forth in SEQ ID NO: 42. The intracellular signaling domain may be CD3ζ with an amino acid sequence as set forth in SEQ ID NO: 44. The amino acid sequence of CAR F231mBBZ is as set forth in SEQ ID NO: 50.

For example, the CAR of the present application may be CAR 1168BBZ whose targeting moiety is scFv 1168, and the amino acid sequence of scFv 1168 is as set forth in SEQ ID NO: 61. The transmembrane domain is CD8a with an amino acid sequence as set forth in SEQ ID NO: 40. The co-stimulatory domain may be 4-1BB with an amino acid sequence as set forth in SEQ ID NO: 42. The intracellular signaling domain may be CD3ζ with an amino acid sequence as set forth in SEQ ID NO: 44. The amino acid sequence of CAR 1168mBBZ is as set forth in SEQ ID NO: 72.

The proteins, polypeptides, amino acid sequences and/or nucleotide sequences involved in the present application should also be understood as at least including the following range: variants or homologues having the same or similar functions as the protein or polypeptide, or the protein or polypeptide encoded by the nucleotide sequence.

Nucleic Acid, Vector, Cell and Composition

In another aspect, the present application provides an isolated nucleic acid molecule encoding the CAR of the present application. In the present application, the isolated nucleic acid molecular encoding CAR may include a nucleic acid sequence as set forth in SEQ ID NO: 47 or SEQ ID NO: 51. The nucleic acid molecule of the present application may be isolated. For example, it may be produced or synthesized by the following methods: (i) in-vitro amplification, for example polymerase chain reaction (PCR) amplification; (ii) clone recombination; (iii) purification, for example digestion and gel electrophoresis classification and isolation; or (iv) synthesis, for example chemical synthesis. In some embodiments, the isolated nucleic acid is a nucleic acid molecule prepared by a recombinant DNA technology.

In another aspect, the present application provides a vector which includes the nucleic acid molecule of the present application. In the present application, the vector may include an mRNA vector, a plasmid vector, a retroviral vector and/or a lentiviral vector. For example, the vector of the present application may be the lentiviral vector, which may include an amino acid sequence as set forth in SEQ ID NO: 47 or SEQ ID NO: 51. In addition, the vector may also include other genes, for example, marker genes allowing selecting this vector in a proper host cell and under appropriate conditions. In addition, the vector may also include an expression control element allowing an encoding region to be correctly expressed in the proper host. Such a control element is well known by those skilled in the art, for example, the control element may include a promoter, a ribosome binding site, an enhancer and other control elements regulating gene transcription or mRNA translation. In some embodiments, the expression control sequence is an adjustable element. The specific structure of the expression control sequence may vary depending on functions of species or cell types, but typically includes a 5' non-transcription sequence and 5' and 3' non-translation sequences participating in transcription and translation initiation respectively, such as a TAT box, a capping sequence and a CAAT sequence. For example, the 5' non-transcription expression control sequence may include a promoter region, and the promoter region includes a promoter sequence for transcriptional control of a functionally linked nucleic acid. One or more nucleic acid molecules of the present application can be operatively connected to the expression control element. The vector may include for example a plasmid, a cosmid, a virus, a bacteriophage, an mRNA vector or other vectors commonly used in, for example, genetic engineering.

In some embodiments, the vector may be a plasmid vector, for example, the vector may include a pCDH-MSCVEF vector. In some embodiments, the vector may be a lentiviral vector, for example, the lentiviral vector may be VSV-g, pMD Gag/Pol or RSV-REV, which may co-transfect the host cell (for example, 293X cell) together with the plasmid vector to obtain the lentiviral vector loaded with plasmids. In the present application, the lentiviral vector loaded with plasmids may include a T120BBZ virus, and may also include a 20BBZ virus. In some embodiments, the vector may be an mRNA vector, for example, the mRNA vector may be ARCA-capped RNA (AM1345, Thermor Fisher), which may be used for producing the mRNA vector loaded with plasmids. In the present application, the mRNA vector loaded with plasmids may include F231mBBZ mRNA, and may also include 20BBZ mRNA.

In another aspect, the present application provides an immunologic effector cell, and the immunologic effector cell includes and/or expresses CAR of the present application, the nucleic acid molecule of the present application or the vector of the present application. In the present application, the immunologic effector cell may be selected from T lymphocytes and naturally killing (NK) cells. In the present application, the T lymphocytes and/or naturally killing cells may be of a natural origin, or induced by stem cells.

In another aspect, the present application provides a method for preparing an immunologic effector cell, including: introducing the vector of the present application into the immunologic effector cell. In some embodiments, each type of cell or each cell may include one vector or one type of vector of the present application. In some embodiments, each type of cell or each cell may include multiple (for example 2 or more) vectors or multiple types (for example, two types or more) of vectors of the present application. For example, the vector of the present application may be introduced into the cells, such as eukaryocytes (for example mammalian cells). For example, the mammalian cells may be 293T cells or 293X cells. The vector of the present application may be introduced into the cells through methods well known in the art, such as electroporation, lipofectine transfection and lipofectamin transfection, etc.

In another aspect, the present application provides a composition which may include the immunologic effector cell of the present application. In some embodiments, the composition may include the immunologic effector cell and a pharmaceutically acceptable adjuvant. The pharmaceutically acceptable adjuvant may include a buffer, an antioxidant, a preservative, a low molecular weight peptide, a protein, a hydrophilic polymer, an amino acid, sugar, a chelator, a counterion, a metal complex and/or a nonionic surfactant, etc. In the present application, the pharmaceutical composition may be prepared for oral administration, intravenous administration, intramuscular administration, in situ administration at tumor sites, inhalation, rectal administration, vaginal administration, percutaneous administration or administration through subcutaneous repository.

Pharmaceutical Applications

In another aspect, the present application provides applications of the CAR, the nucleic acid molecule, the vector or the immunologic effector cell in preparation of drugs, wherein the drugs are used for treating T cell lymphoma or leukemia.

In another aspect, the present application provides applications of the CAR, the nucleic acid molecule, the vector or the immunologic effector cell in preparation of drugs for treating T cell lymphoma or leukemia.

In another aspect, the present application provides a method for treating T cell lymphoma or leukemia, including: administrating the CAR, the nucleic acid molecule, the vector or the immunologic effector cell to a patient.

In the present application, the T cell lymphoma or leukemia may include one or more selected from the following group: peripheral T-cell lymphoma, non-specific peripheral T-cell lymphoma, vascular immunoblastic lymphoma, extranodal NKT-cell lymphoma, anaplastic T-cell lymphoma, ALK positive anaplastic cell lymphoma, ALK negative anaplastic cell lymphoma, T-lymphoblastic lymphoma, cytotoxic T-cell lymphoma, cutaneous T-cell lymphoma, adult T-cell leukemia/lymphoma (ATLL), T-prolymphocytic leukemia (T-PLL), T-large granular lymphoblastic leukemia (T-LGL), hepatosplenic T-cell lymphoma (HSTL), sezary syndrome (SS), subcutaneous tonsil-like T-cell lymphoma and unclassified T-cell lymphoma.

In some embodiments, the CAR, the nucleic acid molecule, the vector or the immunologic effector cell may significantly improve the in-vivo killing effect of tumor cells. For example, the tumor volume may be reduced by 50% or more (for example, 60% or more, 70% or more, 80% or more, and 90% or more, etc.).

In some embodiments, the CAR, the nucleic acid molecule, the vector or the immunologic effector cell may significantly improve the in-vitro killing effect of tumor cells. For example, the tumor volume may be reduced by 50% or more (for example, 60% or more, 70% or more, 80% or more, and 90% or more, etc.).

In some embodiments, the CAR, the nucleic acid molecule, the vector or the immunologic effector cell may selectively kill tumor cells with specific antigens, but substantially does not kill normal T cells (for example, the normal T cells may be normal and healthy T cells which do not belong to T cell lymphoma). For example, the killing effect on the tumor cells with specific antigens (for example Vα24Jα18$^+$) may be improved by 50% or more (for example, 60% or more, 70% or more, 80% or more, and 90% or more, etc.), but the normal T cells are substantially not damaged (for example, the number of T cells is reduced by 5% or less, 4% or less, 3% or less, 2% or less and 1% or less, etc.).

Without wishing to be bound by any particular theory, examples hereinafter are only for illustrating the working manners of the device, method and system of the present application, rather than limiting the scope of the invention involved in the present application.

EXAMPLES

In the present application, corresponding relationships among the binding targets, the target moieties (scFv), CAR, vectors and cell names are as shown in Table 1:

TABLE 1

| Binding target | scFv | CAR | Vectors | Cells |
|---|---|---|---|---|
| Vα24Jα18 | scFvT120 (SEQ ID NO: 1) | CAR T120BBZ (SEQ ID NO: 46) | T120BBZ virus | T120BBZ CAR-T cell |
| HumanCD20 | scFv20 (SEQ ID NO: 37) | CAR 20BBZ (SEQ ID NO: 48) | 20BBZ virus | 20BBZ CAR-T cell |
| Mouse Vβ8 | scFv F231 (SEQ ID NO: 19) | CAR F231mBBZ (SEQ ID NO: 50) | F231mBBZ mRNA | F231mBBZ CAR-T cell |
| Human CD20 | scFv 20 (SEQ ID NO: 37) | CAR 20BBZ (SEQ ID NO: 48) | 20BBZ mRNA | 20BBZ CAR-T cell |
| Human Vβ8 | scFv 1168 (SEQ ID NO: 62) | CAR 1168BBZ (SEQ ID NO: 72) | 1168BBZ virus | 1168BBZ CAR-T cell |

Example 1 Preparation of Anti-Vα24Jα18 CAR-T Cells (T120BBZ CAR-T Cells)

1.1 Construction of Lentiviral Vector pCDH-MSCVEF-T120BBZ and Virus Production

To construct the CAR of the present application (please refer to FIG. 1), firstly, the CAR targeting Vα24Jα18 was prepared, the following sequences were artificially synthesized: scFv T120 (SEQ ID NO: 1), a hinge region (SEQ ID NO: 38), a transmembrane region (SEQ ID NO: 40), a 4-1BB co-stimulatory factor (SEQ ID NO: 42) and a CD3ζ intracellular signaling domain (SEQ ID NO: 44), wherein the 4-1BB co-stimulatory factor and the CD3ζ intracellular signaling domain were connected end to end to obtain BBZ whose sequence is as set forth in SEQ ID NO: 54.

Meanwhile, scFv 20 was constructed as a control, and its sequence is as set forth in SEQ ID NO: 37.

EcoRI and BamHI restriction sites were inserted into two ends of scFv T120 (amino acid sequence SEQ ID NO: 1 and nucleotide sequence SEQ ID NO: 2) and BBZ (SEQ ID NO: 54), which can specifically bind to TCR Vα24Jα18, through overlap PCR, so as to clone the pCDH-MSCVEF vector. PCR amplification was performed, an EcoRI restriction site (containing a proactive basic group), a hinge region, a transmembrane region, a 4-1BB co-stimulatory factor, a CD3ζ intracellular signaling domain and a BamHI restriction site were sequentially added at the 5' end through an extension PCR, and the CAR T120BBZ was obtained by PCR amplification. The clones that were sequenced correctly were subjected to endotoxin-free large-scale extraction by using a NucleoBond Xtra Midi Plus EF kit, and 293X cells were co-transfected using lentivirus package plasmids (VSV-g, pMD Gag/Pol or RSV-REV), then cultured for 48 h under the conditions of 37° C. and 5% $CO_2$, supernatant was collected and filtered at 0.45 μM, and then the filtered supernatant was centrifuged for 2 h at a speed of 25000 RPM using a Beckman ultracentrifuge and a SW28 turret to concentrate the viruses, namely, pCDH-MSCVEF-T120BBZ viruses (T120BBZ viruses for short), which were then used for subsequent production of CAR-T cells.

Figure 2:
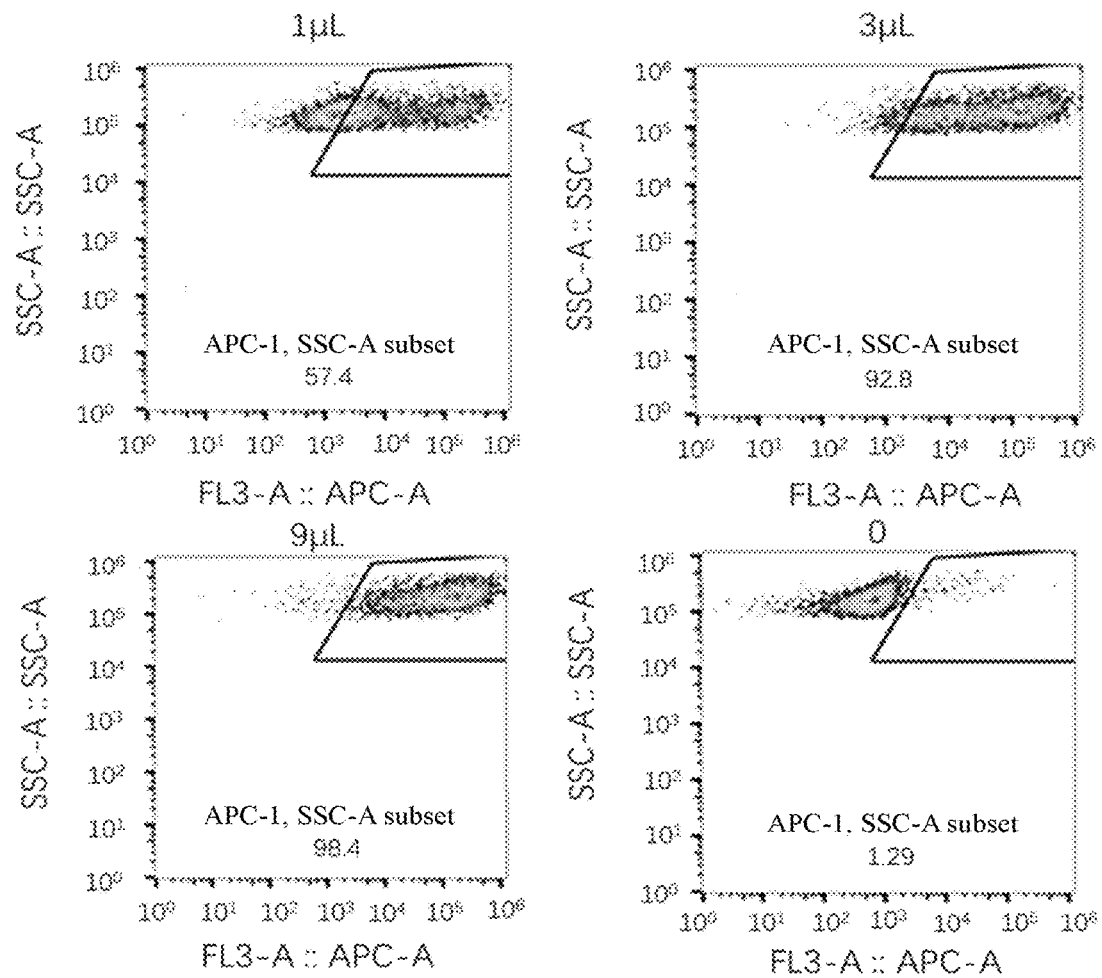
FIG. 2 shows a titre determination result of T120BBZ lentivirus in the present application.

Meanwhile, a method that was the same as the method for preparing the T120BBZ virus was used for producing the control pCDH-MSCVEF-20BBZ viruses (20BBZ viruses for short), the obtained cells were infected with 293 cells, and the virus titer was tested through flow cytometry and by using an anti-mouse Fab antibody (Jackson ImmunoResearch #115-605-006), as shown in FIG. 2. FIG. 2 shows flow cytometry detection results when 1 μL, 3 μL and 9 μL of the T120BBZ viruses were added, and samples without addition of viruses were used as blank control.

The results show that the expression amount of the CAR T120BBZ is increased accordingly along with an increase in the dosage of the added viruses.

1.2 Preparation of T120BBZ CAR-T Cells and 20BBZ CAR-T Cells

Figure 3:
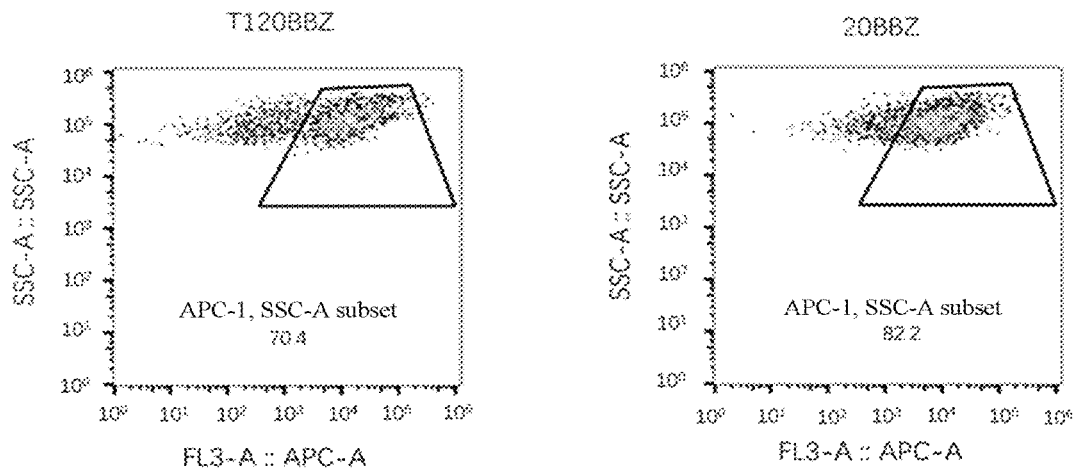
FIG. 3 shows a CAR expression analysis detection result of T120BBZ CAR-T in the present application.

Human PBMC was purified by a Stemcell T cell isolation kit (purchased from stem cell Catlog #19671) and then inoculated into a 96-well plate coated with anti-hCD3 (purchased from Bioxcell #BE0001-2) and anti-hCD28 (purchased from Bioxcell #BE0248). After 2 days, the T120BBZ viruses and 20BBZ viruses prepared in step 1.1 of the present example were infected according to MOI=10-20. After 1 day, the solution was changed for further cell culture, the culture medium is an RPMI complete culture medium containing 10% FBS, TL2 (501U/ml) and IL21 (4 ng/ml), stimulation was performed using artificial antigen-presenting cells (Raji cells irradiated by X-ray 100Gray) or anti-hCD3 (0.1 μg/ml) or anti-hCD28 (0.25 μg/ml) every 6 days. After 2 rounds of stimulation, the obtained cells were T120BBZ CAR-T cells and 20BBZ CAR-T cells, and T120BBZ CAR-T cells were stained with Alexa Fluor®647 AffiniPure F(ab')$_2$ Fragment Goat Anti-Human IgG and Fab fragment specific secondary antibody through flow staining. The results are as shown in FIG. 3.

The results show that the obtained cells are all CAR-positive.

Example 2 Preparation of Anti-Vβ8 CAR-T (F231mBBZ) Cells 2.1 Production of Anti-Vβ8 CAR-T (F231mBBZ) mRNA Similar to example 1, CAR of targeting mouse Vβ8 was prepared, the following sequences were artificially synthesized: scFvF231 (SEQ ID NO: 19) and mBBZ (SEQ ID NO: 56), wherein mBBZ is formed by connecting a mouse-derived 4-1BB co-stimulatory factor with a CD3ζ intracellular signaling domain end to end.

EcoRI and BamHI restriction sites were inserted into two ends of scFv F231 (SEQ ID 19) and mBBZ (SEQ ID NO: 56), which can specifically bind to TCR Vβ8, through overlap PCR, so as to clone the pCDH-MSCVEF vector. PCR amplification was performed, an EcoRI restriction site (containing a proactive basic group), a hinge region, a transmembrane region, a 4-1BB co-stimulatory factor, a CD3ζ intracellular signaling domain and a BamHI restriction site were sequentially added at the 5' end through an extension PCR, and the CAR F231mBBZ (SEQ ID NO: 51) was obtained by PCR amplification. A T7RNA polymerase promoter sequence was introduced into the 5' end through a primer, the PCR product was recovered and purified, and F231mBBZ mRNA was produced using an mMESSAGEmMACHINE® T7 Ultra Kit. Meanwhile, control 20BBZ mRNA was produced using the same method.

2.2 Preparation of F231mBBZ CAR-T Cells and 20BBZ CAR-T Cells

After being purified by a Mouse CD3 T Cell Isolation Kit cell isolation kit (purchased from biolegend #480031), mouse spleen cells were inoculated into a 96-well culture plate. After being activated for 2 days via ConA (purchased from sigma #C2010), F231mBBZ mRNA and 20BBZ mRNA were electro-transfected using ECM830. The obtained cells were F231mBBZ CAR-T cells and 20BBZ CAR-T cells.

Example 3 Preparation of Anti-1168 CAR-T Cells (1168BBZ CAR-T Cells)

3.1 Construction of Lentiviral Vector pCDH-MSCVEF-1168BBZ and Virus Production

According to the method in example 1, firstly, CAR of targeting human Vβ8 was prepared, the following sequences were artificially synthesized: scFv 1168 (SEQ ID NO: 62), a hinge region (SEQ ID NO: 38), a transmembrane region (SEQ ID NO: 40), a 4-1BB co-stimulatory factor (SEQ ID NO: 42) and a CD3ζ intracellular signaling domain (SEQ ID NO: 44), wherein BBZ was obtained by connecting the 4-1BB co-stimulatory factor with the CD3ζ intracellular signaling domain end to end, and its sequence is as set forth in SEQ ID NO: 54.

Meanwhile, scFv 20 was constructed as a control, and its sequence is as set forth in SEQ ID NO: 37.

EcoRI and BamHI restriction sites were inserted into two ends of scFv 1168 (SEQ ID NO: 62) and mBBZ (SEQ ID NO: 54), which can specifically bind to human Vβ8, through overlap PCR, so as to clone the pCDH-MSCVEF vector. PCR amplification was performed, an EcoRI restriction site (containing a proactive basic group), a hinge region, a transmembrane region, a 4-1BB co-stimulatory factor, a CD3ζ intracellular signaling domain and a BamHI restriction site were sequentially added at the 5' end through an extension PCR, and the CAR 1168BBZ was obtained by PCR amplification. The clones that were sequenced correctly were subjected to endotoxin-free large-scale extraction by using a NucleoBond Xtra Midi Plus EF Kit, and 293X cells were co-transfected using lentivirus package plasmid (VSV-g, pMD Gag/Pol or RSV-REV) and then cultured for 48 h under conditions of 37° C. and 5% CO$_2$, supernatant was collected and filtered at 0.45 μM, and then the filtered supernatant was centrifuged for 2 h at a speed of 25000 RPM using a Beckman ultracentrifuge and a SW28 turret to concentrate the viruses, namely, pCDH-MSCVEF-1168BBZ viruses (1168BBZ viruses for short), which were then used for subsequent production of CAR-T cells.

Figure 9:
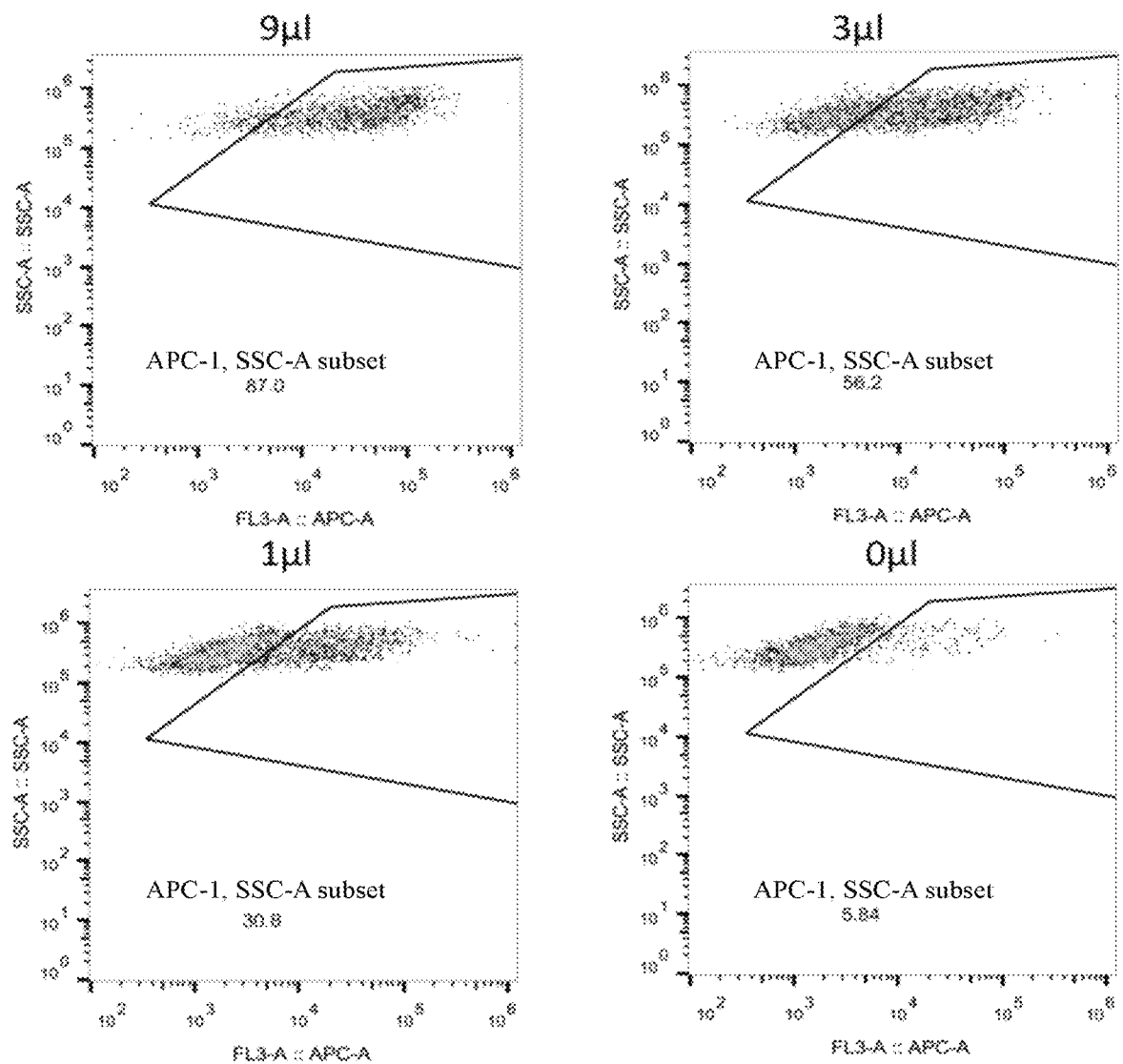
FIG. 9 shows a titer analysis and detection result of 1168BBZ lentivirus in the present application.

Meanwhile, a method that was the same as the method for preparing the 1168BBZ viruses was used for producing the control pCDH-MSCVEF-20BBZ viruses (20BBZ viruses for short), the obtained cells were infected with 293 cells, and the virus titer was tested through flow cytometry and by using an anti-mouse Fab antibody (Jackson ImmunoResearch #115-605-006), as shown in FIG. 9. FIG. 9 shows flow cytometry detection results when 1 μL, 3 μL and 9 μL of 1168BBZ viruses were added, and samples without addition of viruses were used as blank control.

The results show that the expression amount of the CAR 1168BBZ is increased accordingly along with an increase in the dosage of the added viruses.

3.2 Preparation of 1168BBZ CAR-T Cells and 20BBZ CAR-T Cells

Figure 10:
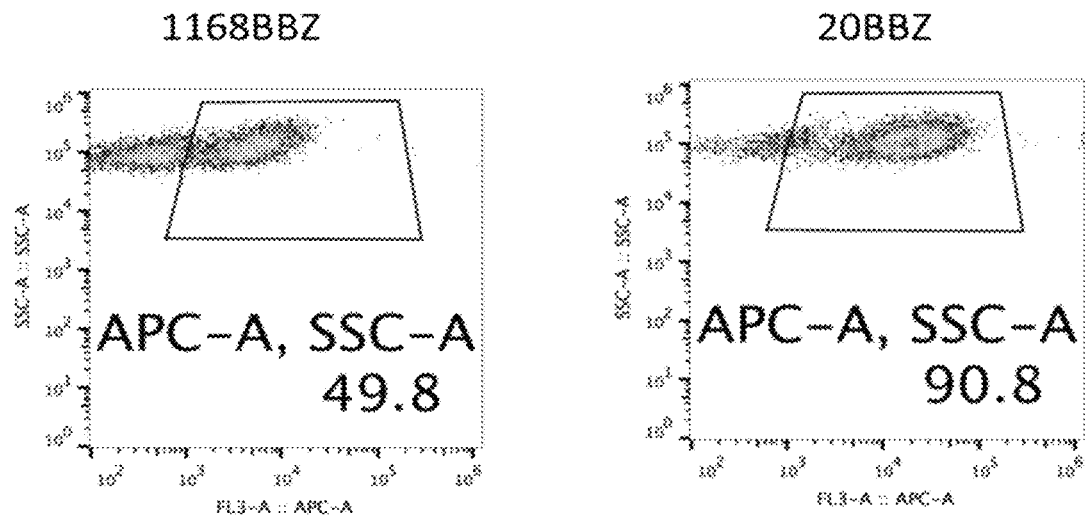
FIG. 10 shows a CAR expression analysis and detection result of 1168BBZ CAR-T in the present application.

Human PBMC was purified by a Stemcell T cell isolation kit (purchased from stem cell Catlog #19671) and then inoculated into a 96-well plate coated with anti-hCD3 (purchased from Bioxcell #BE0001-2) and anti-hCD28 (purchased from Bioxcell #BE0248). After 2 days, the 1168BBZ viruses and 20BBZ viruses prepared in step 1.1 of the present example were infected according to MOI=10-20. After 1 day, the solution was changed for further cell culture, the culture medium is an RPMI complete culture medium containing 10% FBS, 1L2 (501U/ml) and IL21 (4 ng/ml), stimulation was performed using artificial antigen-presenting cells (Raji cells irradiated by X-ray 100Gray) or anti-hCD3 (0.1 μg/ml) or anti-hCD28 (0.25 μg/ml) every 6 days. After 2 rounds of stimulation, the obtained cells were 1168BBZ CAR-T cells and 20BBZ CAR-T cells. Staining was performed with an anti-mouse Fab antibody (Jackson ImmunoResearch #115-605-006) secondary antibody through flow staining. The results are as shown in FIG. 10.

The results show that the obtained cells are all CAR-positive.

Figure 4:
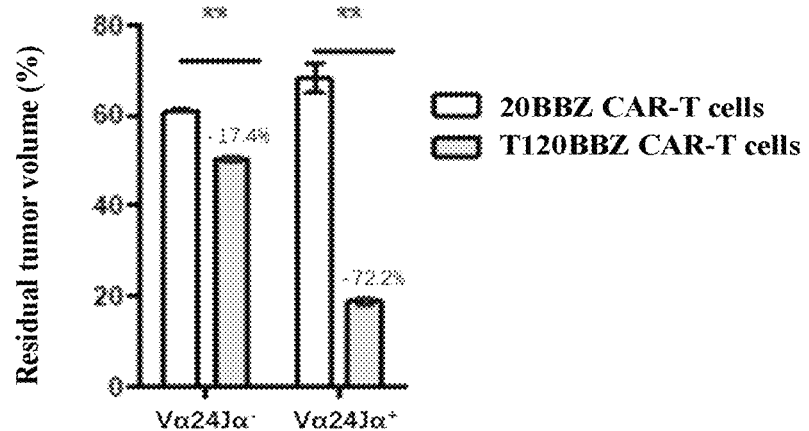
FIG. 4 shows a detection result of killing of T120BBZ CAR-T on Vα24Jα18+ tumor cells in the present application.
Figure 5:
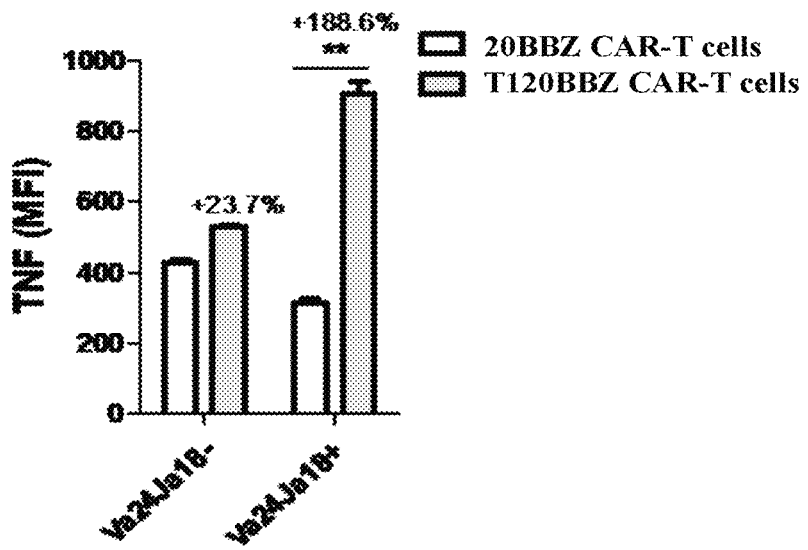
FIG. 5 shows a detection result of Vα24Jα18+ tumor cells specifically inducing T120BBZ CAR-T to secrete TNF in the present application.

Example 4 In-Vitro Killing of 4T120BBZ CAR-T on Tumor Cells and Release of Effector Molecule The T120BBZ CAR-T cells prepared in example 1 were taken, and 20BBZ CAR-T cells were used as a control. The T120BBZ CAR-T cells, the 20BBZ CAR-T cells and NALM6-Vα24Jα18$^+$ cells were co-cultured under the conditions of 37° C. and 5% $CO_2$, after 24 h, the survival of NALM6-Vα24Jα18$^+$ and release of TNF were detected using a flow cytometry, and T120BBZ CAR-T is capable of selectively killing the tumor cells of Vα24Jα18$^+$ and releasing more TNFs. The detection result of the killing effect of tumors is as shown in FIG. 4, and the detection result of TNF release is as shown in FIG. 5.

The results show that compared with control CAR-T cells, the T120BBZ CAR-T cells have a stronger killing effect on Vα24Jα18$^+$ tumor cells than on Vα24Jα18$^-$ tumor cells. Compared with the control CAR-T cells, after the T120BBZ CAR-T cells are administrated, Vα24Jα18$^-$ tumor cells are reduced by 17.4%, and Vα24Jα18$^+$ tumor cells are reduced by 72.2%, proving that T120BBZ CAR is specific to Vα24Jα18. Furthermore, compared with the control CAR-T cells, after T120BBZ CAR-T cells are administrated, the TNF release amount of Vα24Jα18$^-$ tumor cells is slightly increased (increased by 23.7%), and the TNF release amount of Vα24Jα18$^+$ tumor cells is significantly increased (increased by 188.6%), proving that T120BBZ CAR is specific to Vα24Jα18.

Example 5 In-Vitro Killing of 5 F231mBBZ CAR-T Cells on Tumor Cells

Figure 6A:
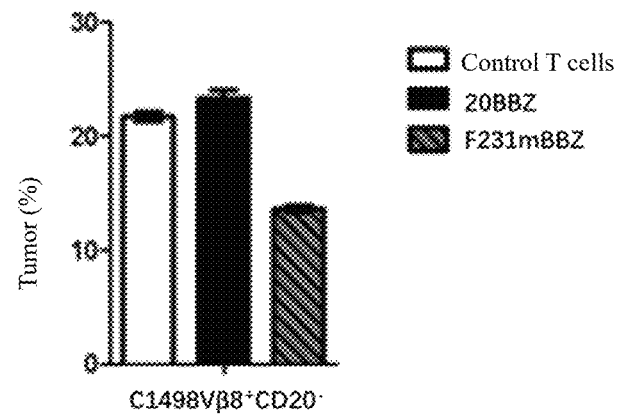
FIGS. 6A-6B show that F231BBZ CAR-T of the present application can specifically kill Vβ8+ tumor cells and release IFN.
Figure 6B:
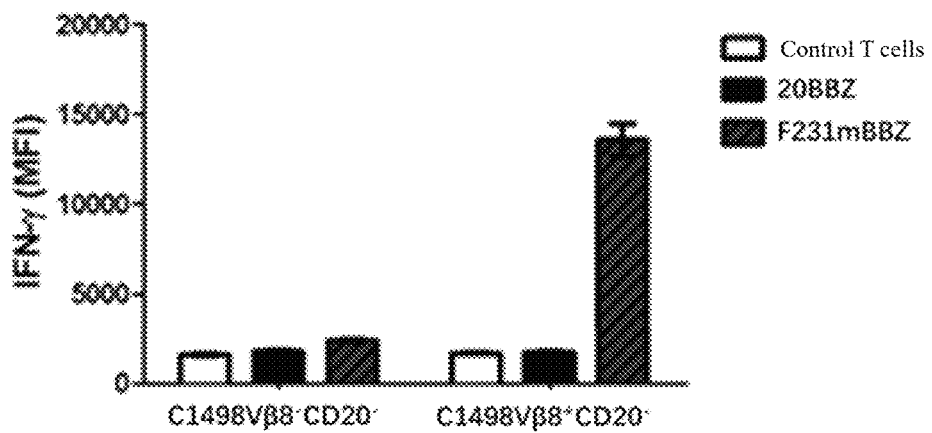

F231mBBZ CAR-T cells and 20BBZ CAR-T cells prepared in step 2.2 of example 2 were inoculated into a 96-well plate, meanwhile T cells that were not infected by viruses were used as a negative control, the above cells, the negative control and C1498Vβ8$^-$CD20$^-$ or C1498Vβ8$^+$CD20$^-$ tumor cells were co-cultured under the conditions of 37° C. and 5% $CO_2$, after 24 h, TCRVb8.1/8.2 (Biolegend #118406) was stained with a flow cytometry. The survival proportion of tumor cells and release of IFNγ were compared. The results are as shown in FIGS. 6A-6B.

The results show that F231mBBZ CAR-T cells are capable of selectively killing the tumor cells of Vβ8$^+$ and releasing more IFNγ.

Figure 11:
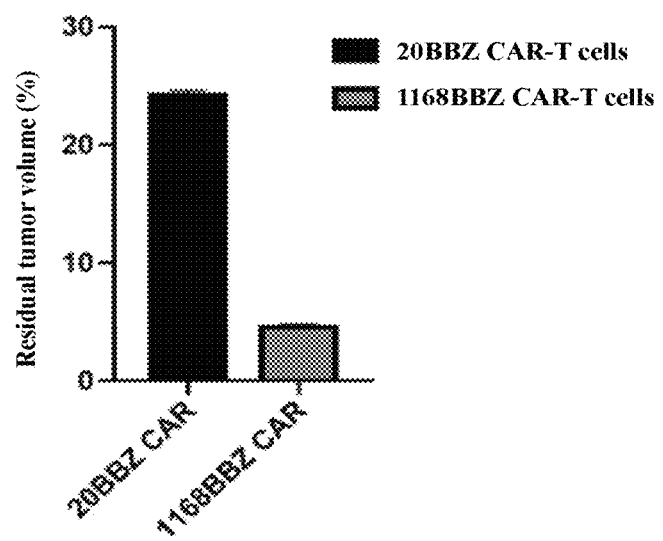
FIG. 11 shows a detection result of killing of 1168BBZ CAR-T on Vβ8+ tumor cells in the present application.

Example 6 In-Vitro Killing of 61168BBZ CAR-T on Tumor Cells and Release of Effector Molecules 61168BBZ CAR-T cells prepared in example 3, 20BBZ CAR-T cells as a control and Vβ8$^+$ Jurkat cells were co-cultured under the conditions of 37° C. and 5% $CO_2$, and after 24 h, the survival of tumor cells was detected by a flow cytometry. 1168BBZ CAR-T cells were capable of selectively killing the tumor cells of Vβ8$^+$. The detection result of the killing effect of the tumor is as shown in FIG. 11.

The result shows that compared with the control CAR-T cells, the tumor killing effect of 1168BBZ CAR-T cells on Vβ8$^+$ is stronger than that of 20BBZ on Vβ8$^+$. Compared with the control CAR-T cells, after 1168BBZ CAR-T cells are administrated, the number of survived tumor cells is reduced, proving that 1168BBZ CAR is specific to Vβ8.

The result shows that the 1168BBZ CAR cells are capable of selectively killing the tumor cells of human Vβ8$^+$.

Figure 7A:
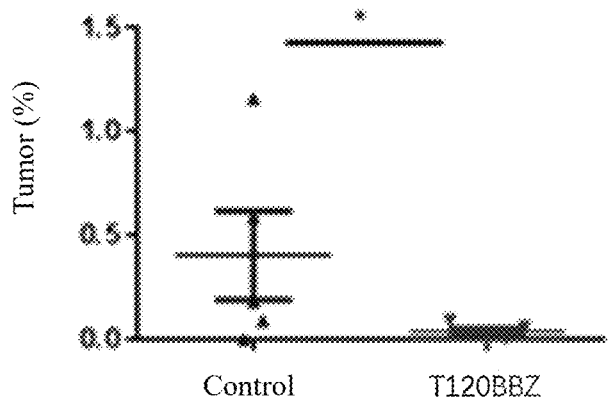
FIGS. 7A-7C show in-vivo anti-tumor activity analysis of T120BBZ CAR-T in the present application.
Figure 7B:
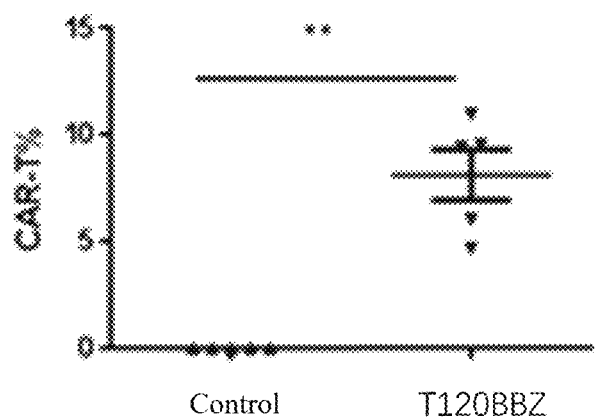
Figure 7C:
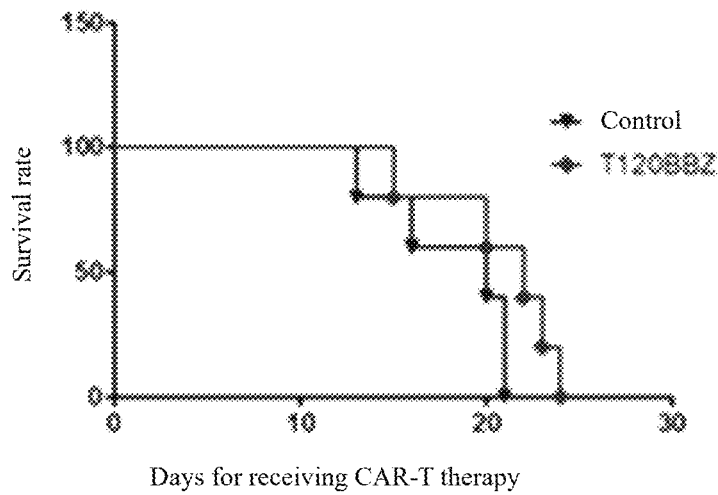

Example 7 Analysis on In-Vivo Killing Capability of 7 T120BBZ CAR-T Cells on Tumor Cells $10^6$ NALM6 Vα24Jα18$^+$ tumor cells were inoculated into a B-NDG mouse (Biocytogen) via intravenous injection, after 6 days, $10^7$ T120BBZ CAR-T cells were intravenously administrated for treatment, meanwhile T cells that were not infected with viruses were used as a negative control. On day 7, 5 drops of peripheral blood (100 μL) were used to detect the contents of tumor cells and CAR-T cells in the peripheral blood by virtue of flow cytometry. The results are as shown in FIGS. 7A-7C, respectively.

The results show that compared with the control, the T120BBZ CAR-T cells reduce the tumors in the mouse by 82.9% (3.798 mm$^3$ to 0.646 mm$^3$). The T120BBZ CAR-T cells significantly prolong the tumor load of the mouse, and are capable of amplifying and prolonging the survival of the mouse in vivo.

Example 8 TCR Composition Analysis of 8 T120BBZ CAR-T Cells

Figure 8A:
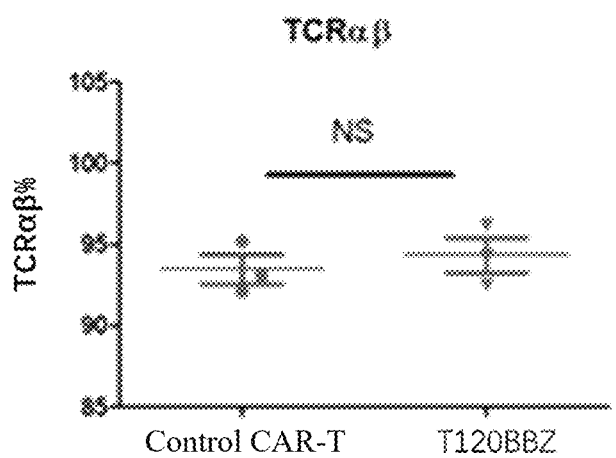
FIGS. 8A-8C show TCR expression analysis of T120BBZ CAR-T in the present application.
Figure 8B:
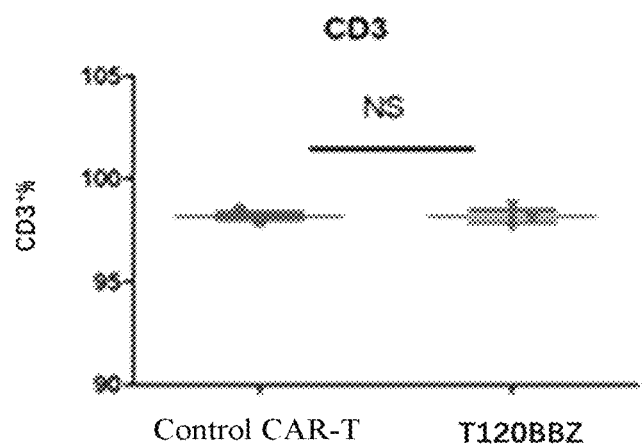
Figure 8C:
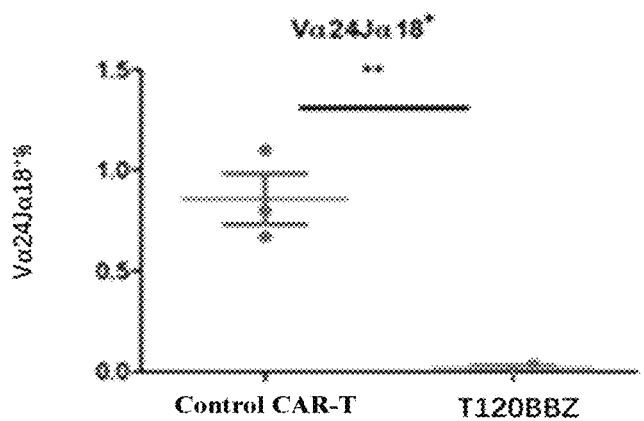

T120BBZ CAR-T cells prepared in example 1 and 20BBZ CAR-T cells as a control were stained by using anti-TCRαβ (Biolegend #306708), anti-CD3 (Biolegend #317306) and anti-Vα24Jα18$^+$ (Biolegend #342912). The changes in the specific target TCR (Vα24Jα18$^+$) compositions were analyzed via flow cytometry. The results are as shown in FIGS. 8A-8C. The results show that compared with the control CAR-T cells, Vα24Jα18$^+$ tumor cells in T120BBZ CAR-T are significantly reduced, proving that T120BBZ CAR-T is capable of selectively and specifically killing the T cells of Vα24Jα18$^+$, but there is no significant difference for TCRαβ cells and CD3$^+$ cells (NS, not significant), providing that T cells of other TCRαβ subtypes and CD3 compositions in TCR complex are retained, which indicates that most of T cell subunits are retained, and the immune function of T cells is slightly affected.

The above detailed descriptions are provided by way of explanation and examples, rather than limiting the scope of attached claims. At present, many variations of embodiments listed herein are obvious to persons of ordinary skills in the art, and fall within the scope of attached claims and their equivalent solutions.

The invention claimed is:

1. A chimeric antigen receptor (CAR), comprising:
a transmembrane domain,
a co-stimulatory domain,
an intracellular signaling domain, and
a targeting moiety that comprises an antibody or a fragment thereof and that specifically binds to human and/or mouse T cell receptor (TCR) variable regions Vβ and/or fragments thereof,
wherein said antibody or a fragment comprises heavy chain complementary determining region 1-3 (HCDR1-3) and light chain complementary determining region 1-3 (LCDR1-3) and
the HCDR1 comprises the amino acid sequence of SEQ ID NO:67, the HCDR2 comprises the amino acid sequence of SEQ ID NO:68 and the HCDR3 comprises the amino acid sequence of SEQ ID NO: 69,
the LCDR1 comprises the amino acid sequence in SEQ ID NO:64, the LCDR2 comprises the amino acid sequence in SEQ ID NO:65, and the LCDR3 comprises the amino acid sequence in SEQ ID NO:66.

2. The CAR according to claim 1, wherein the antibody comprises a heavy chain variable region and a light chain variable region, and wherein the heavy chain variable region (VH) comprises the amino acid sequence of SEQ ID NO:71 and the light chain variable region (VL) comprises the amino acid sequence of SEQ ID NO:70.

3. The CAR according to claim 1, wherein the antibody comprises the amino acid sequence of SEQ ID NO: 62.

4. The CAR according to claim 1, wherein the transmembrane domain comprises polypeptides derived or selected from the following proteins: CD8, CD28, CD137 and/or CD3.

5. The CAR according to claim 1, wherein the transmembrane domain comprises an amino acid sequence as set forth in SEQ ID NO: 40.

6. The CAR according to claim 1, wherein the co-stimulatory domain comprises polypeptides derived or selected from the following proteins: ICOS, CD28, CD27, HVEM, LIGHT, CD40L, 4-1BB, OX40, DR3, GITR, CD30, TIM1, SLAM, CD2 and/or CD226.

7. The CAR according to claim 1, wherein the co-stimulatory domain comprises an amino acid sequence as set forth in SEQ ID NO: 42.

8. The CAR according to claim 1, wherein said intracellular signaling domain comprises a signaling domain from CD3ζ.

9. The CAR according to claim 1, wherein the intracellular signaling domain comprises an amino acid sequence as set forth in SEQ ID NO: 44.

10. The CAR according to claim 1, wherein the CAR further comprises a hinge region, and the hinge region connects the antibody and the transmembrane domain.

11. The CAR according to claim 10, wherein the hinge region comprises polypeptides derived or selected from the following proteins: CD8a and/or IgG.

12. The CAR according to claim 10, wherein the hinge region comprises an amino acid sequence as set forth in SEQ ID NO: 38.

13. The CAR according to claim 1, comprising the amino acid sequence of SEQ ID NO: 72.

14. An immunologic effector cell, comprising and/or expressing the CAR of claim 1.

15. The cell according to claim 14, wherein the immunologic effector cell is selected from T lymphocytes and natural killing (NK) cells.

16. A method of treating T cell lymphoma or leukemia, comprising administering to a subject in need thereof the immunologic effector cell of claim 14.

17. A method of treating T cell lymphoma or leukemia, comprising administering to a subject in need thereof the CAR of claim 1.

18. The method according to claim 17, wherein the T cell lymphoma or leukemia comprises one or more selected from the following group: peripheral T-cell lymphoma, non-specific peripheral T-cell lymphoma, vascular immunoblastic lymphoma, extranodal NKT-cell lymphoma, anaplastic T-cell lymphoma, ALK positive anaplastic cell lymphoma, ALK negative anaplastic cell lymphoma, T-lymphoblastic lymphoma, cytotoxic T-cell lymphoma, cutaneous T-cell lymphoma, adult T-cell leukemia/lymphoma (ATLL), T-prolymphocytic leukemia (T-PLL), T-large granular lymphocytic leukemia (T-LGL), hepatosplenic T-cell lymphoma (HSTL), sezary syndrome (SS), subcutaneous tonsil-like T-cell lymphoma and unclassified T-cell lymphoma.

* * * * *

SEQUENCE LISTING

<160> NUMBER OF SEQ ID NOS: 73

<210> SEQ ID NO 1
<211> LENGTH: 266
<212> TYPE: PRT
<213> ORGANISM: Artificial Sequence
<220> FEATURE:
<223> OTHER INFORMATION: scFv T120

<400> SEQUENCE: 1

```
Met Glu Thr Asp Thr Leu Leu Leu Trp Val Leu Leu Trp Val Pro
1               5                   10                  15

Gly Ser Thr Gly Thr Gly Asp Ile Gln Met Thr Gln Ser Pro Ser
            20                  25                  30

Leu Ser Ala Ser Val Gly Asp Arg Val Thr Ile Thr Cys Lys Ala Ser
        35                  40                  45

Gln Asp Val Ser Thr Ala Val Ala Trp Tyr Gln Gln Lys Pro Gly Gln
    50                  55                  60

Ala Pro Arg Leu Leu Ile Tyr Trp Ala Ser Thr Arg His Thr Gly Val
65                  70                  75                  80

Pro Ser Arg Phe Ser Gly Ser Gly Ser Gly Thr Asp Phe Thr Leu Thr
                85                  90                  95

Ile Ser Ser Leu Gln Pro Glu Asp Phe Ala Leu Tyr Tyr Cys Gln Gln
            100                 105                 110

His Tyr Ser Thr Pro Trp Thr Phe Gly Gln Gly Thr Lys Leu Glu Ile
        115                 120                 125

Lys Gly Gly Gly Gly Ser Gly Gly Gly Gly Ser Gly Gly Gly Gly Ser
    130                 135                 140

Glu Val Gln Leu Val Glu Ser Gly Gly Gly Leu Val Gln Pro Gly Gly
145                 150                 155                 160

Ser Leu Arg Leu Ser Cys Val Ala Ser Gly Phe Thr Phe Ser Asn Tyr
                165                 170                 175

Trp Met Asn Trp Val Arg Gln Ala Pro Gly Lys Gly Leu Glu Trp Val
            180                 185                 190

Ala Glu Ile Arg Leu Lys Ser Asn Asn Tyr Ala Thr His Tyr Ala Glu
        195                 200                 205

Ser Val Lys Gly Arg Phe Thr Ile Ser Arg Asp Asp Ser Lys Asn Thr
    210                 215                 220

Val Tyr Leu Gln Met Asn Ser Leu Arg Ala Glu Asp Thr Ala Val Tyr
225                 230                 235                 240

Tyr Cys Thr Arg Asn Gly Asn Tyr Val Asp Tyr Ala Met Asp Tyr Trp
                245                 250                 255

Gly Gln Gly Thr Leu Val Thr Val Ser Ser
            260                 265
```

<210> SEQ ID NO 2
<211> LENGTH: 798
<212> TYPE: DNA
<213> ORGANISM: Artificial Sequence
<220> FEATURE:
<223> OTHER INFORMATION: scFv T120 (nucleotide)

<400> SEQUENCE: 2

```
atggagacag acacactcct gctatgggta ctgctgctct ggttccagg ttccactggt     60 accggtgata tccagatgac ccagtccccg agctccctgt ccgcctctgt gggcgatagg    120
gtcactatca cctgcaaagc cagtcaggat gtgagcactg ctgtagcctg gtatcaacag    180
```

```
aaacccggac aggccccgcg tctgctgatt tactgggcat ccacccgtca taccggagtc    240
ccttctcgct tctctggttc cggctctggg acggatttca ctctgaccat cagctccctg    300
cagccggaag acttcgcact gtattactgt cagcaacact atagcactcc gtggacgttc    360
ggacagggta ccaagctgga gatcaaaggc ggaggcggat caggcggcgg tggatctggg    420
ggtggcggat ctgaagtaca gctggtggag tctggaggag gcttggtgca acctggagga    480
tccctgcgtc tctcctgtgt tgcctctgga ttcactttca gtaactactg gatgaactgg    540
gtccgccagg cgccaggtaa ggggcttgag tgggttgctg aaattagatt gaaatctaat    600
aattatgcaa cacattatgc ggagtctgtg aaagggaggt tcaccatctc aagagatgat    660
tccaaaaata ccgtctacct gcaaatgaac agcttaagag ctgaagacac tgcggtttat    720
tactgtaccc ggaacggtaa ttacgtggat tatgctatgg actactgggg tcaaggaacc    780
ctggtcaccg tctcctca                                                 798
```

<210> SEQ ID NO 3
<211> LENGTH: 6
<212> TYPE: PRT
<213> ORGANISM: Artificial Sequence
<220> FEATURE:
<223> OTHER INFORMATION: T120 LCDR1

<400> SEQUENCE: 3

Gln Asp Val Ser Thr Ala
1               5

<210> SEQ ID NO 4
<211> LENGTH: 3
<212> TYPE: PRT
<213> ORGANISM: Artificial Sequence
<220> FEATURE:
<223> OTHER INFORMATION: T120 LCDR2

<400> SEQUENCE: 4

Trp Ala Ser
1

<210> SEQ ID NO 5
<211> LENGTH: 9
<212> TYPE: PRT
<213> ORGANISM: Artificial Sequence
<220> FEATURE:
<223> OTHER INFORMATION: T120 LCDR3

<400> SEQUENCE: 5

Gln Gln His Tyr Ser Thr Pro Trp Thr
1               5

<210> SEQ ID NO 6
<211> LENGTH: 18
<212> TYPE: DNA
<213> ORGANISM: Artificial Sequence
<220> FEATURE:
<223> OTHER INFORMATION: T120 LCDR1 (nucleotide)

<400> SEQUENCE: 6
caggatgtga gcactgct                                                  18

<210> SEQ ID NO 7
<211> LENGTH: 9
<212> TYPE: DNA
<213> ORGANISM: Artificial Sequence
<220> FEATURE:

<223> OTHER INFORMATION: T120 LCDR2 (nucleotide)

<400> SEQUENCE: 7 tgggcatcc                                                                   9

<210> SEQ ID NO 8
<211> LENGTH: 27
<212> TYPE: DNA
<213> ORGANISM: Artificial Sequence
<220> FEATURE:
<223> OTHER INFORMATION: T120 LCDR3 (nucleotide)

<400> SEQUENCE: 8
cagcaacact atagcactcc gtggacg                                              27

<210> SEQ ID NO 9
<211> LENGTH: 107
<212> TYPE: PRT
<213> ORGANISM: Artificial Sequence
<220> FEATURE:
<223> OTHER INFORMATION: T120 VL

<400> SEQUENCE: 9

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Thr Ala
            20                  25                  30

Val Ala Trp Tyr Gln Gln Lys Pro Gly Gln Ala Pro Arg Leu Leu Ile
        35                  40                  45

Tyr Trp Ala Ser Thr Arg His Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Leu Tyr Tyr Cys Gln Gln His Tyr Ser Thr Pro Trp
                85                  90                  95

Thr Phe Gly Gln Gly Thr Lys Leu Glu Ile Lys
            100                 105

<210> SEQ ID NO 10
<211> LENGTH: 321
<212> TYPE: DNA
<213> ORGANISM: Artificial Sequence
<220> FEATURE:
<223> OTHER INFORMATION: T120 VL (nuleotide)

<400> SEQUENCE: 10
gatatccaga tgacccagtc cccgagctcc ctgtccgcct ctgtgggcga tagggtcact      60
atcacctgca aagccagtca ggatgtgagc actgctgtag cctggtatca acagaaaccc     120
ggacaggccc cgcgtctgct gatttactgg gcatccaccc gtcataccgg agtcccttct     180
cgcttctctg gttccggctc tgggacggat tcactctga ccatcagctc cctgcagccg      240
gaagacttcg cactgtatta ctgtcagcaa cactatagca ctccgtggac gttcggacag     300
ggtaccaagc tggagatcaa a                                               321

<210> SEQ ID NO 11
<211> LENGTH: 8
<212> TYPE: PRT
<213> ORGANISM: Artificial Sequence
<220> FEATURE:
<223> OTHER INFORMATION: T120 HCDR1

<400> SEQUENCE: 11

Gly Phe Thr Phe Ser Asn Tyr Trp
1               5

<210> SEQ ID NO 12
<211> LENGTH: 10
<212> TYPE: PRT
<213> ORGANISM: Artificial Sequence
<220> FEATURE:
<223> OTHER INFORMATION: T120 HCDR2

<400> SEQUENCE: 12

Ile Arg Leu Lys Ser Asn Asn Tyr Ala Thr
1               5                   10

<210> SEQ ID NO 13
<211> LENGTH: 13
<212> TYPE: PRT
<213> ORGANISM: Artificial Sequence
<220> FEATURE:
<223> OTHER INFORMATION: T120 HCDR3

<400> SEQUENCE: 13

Thr Arg Asn Gly Asn Tyr Val Asp Tyr Ala Met Asp Tyr
1               5                   10

<210> SEQ ID NO 14
<211> LENGTH: 24
<212> TYPE: DNA
<213> ORGANISM: Artificial Sequence
<220> FEATURE:
<223> OTHER INFORMATION: T120 HCDR1 (nucleotide)

<400> SEQUENCE: 14
ggattcactt tcagtaacta ctgg                                              24

<210> SEQ ID NO 15
<211> LENGTH: 30
<212> TYPE: DNA
<213> ORGANISM: Artificial Sequence
<220> FEATURE:
<223> OTHER INFORMATION: T120 HCDR2 (nucleotide)

<400> SEQUENCE: 15
attagattga aatctaataa ttatgcaaca                                        30

<210> SEQ ID NO 16
<211> LENGTH: 39
<212> TYPE: DNA
<213> ORGANISM: Artificial Sequence
<220> FEATURE:
<223> OTHER INFORMATION: T120 HCDR3 (nucleotide)

<400> SEQUENCE: 16
acccggaacg gtaattacgt ggattatgct atggactac                              39

<210> SEQ ID NO 17
<211> LENGTH: 122
<212> TYPE: PRT
<213> ORGANISM: Artificial Sequence
<220> FEATURE:
<223> OTHER INFORMATION: T120 VH

<400> SEQUENCE: 17

Glu Val Gln Leu Val Glu Ser Gly Gly Gly Leu Val Gln Pro Gly Gly
1               5                   10                  15

Ser Leu Arg Leu Ser Cys Val Ala Ser Gly Phe Thr Phe Ser Asn Tyr
            20                  25                  30

Trp Met Asn Trp Val Arg Gln Ala Pro Gly Lys Gly Leu Glu Trp Val
        35                  40                  45

Ala Glu Ile Arg Leu Lys Ser Asn Asn Tyr Ala Thr His Tyr Ala Glu
 50                  55                  60

Ser Val Lys Gly Arg Phe Thr Ile Ser Arg Asp Asp Ser Lys Asn Thr
 65                  70                  75                  80

Val Tyr Leu Gln Met Asn Ser Leu Arg Ala Glu Asp Thr Ala Val Tyr
                 85                  90                  95

Tyr Cys Thr Arg Asn Gly Asn Tyr Val Asp Tyr Ala Met Asp Tyr Trp
            100                 105                 110

Gly Gln Gly Thr Leu Val Thr Val Ser Ser
            115                 120

<210> SEQ ID NO 18
<211> LENGTH: 366
<212> TYPE: DNA
<213> ORGANISM: Artificial Sequence
<220> FEATURE:
<223> OTHER INFORMATION: T120 VH (nucleotide)

<400> SEQUENCE: 18
gaagtacagc tggtggagtc tggaggaggc ttggtgcaac tggaggatc cctgcgtctc      60 tcctgtgttg cctctggatt cactttcagt aactactgga tgaactgggt ccgccaggcg    120
ccaggtaagg gcttgagtg ggttgctgaa attagattga aatctaataa ttatgcaaca     180
cattatgcgg agtctgtgaa agggaggttc accatctcaa gagatgattc caaaaatacc    240
gtctacctgc aaatgaacag cttaagagct gaagacactg cggtttatta ctgtacccgg    300
aacggtaatt acgtggatta tgctatggac tactggggtc aaggaaccct ggtcaccgtc    360
tcctca                                                               366

<210> SEQ ID NO 19
<211> LENGTH: 269
<212> TYPE: PRT
<213> ORGANISM: Artificial Sequence
<220> FEATURE:
<223> OTHER INFORMATION: scFv F231

<400> SEQUENCE: 19

Met Glu Thr Asp Thr Leu Leu Leu Trp Val Leu Leu Leu Trp Val Pro
 1               5                   10                  15

Gly Ser Thr Gly Thr Gly Asp Ile Val Met Thr Gln Ser Gln Lys Phe
            20                  25                  30

Met Ser Thr Ser Val Gly Asp Arg Val Ser Ile Thr Cys Lys Ala Ser
        35                  40                  45

Gln Ile Val Arg Thr Ala Val Ala Trp Tyr Gln Gln Lys Pro Gly Gln
 50                  55                  60

Ser Pro Lys Ala Leu Ile Tyr Leu Ala Ser Asn Arg His Thr Gly Val
 65                  70                  75                  80

Pro Asp Arg Phe Thr Gly Ser Gly Ser Gly Thr Asp Phe Thr Leu Thr
                 85                  90                  95

Ile Ser Asn Val Gln Ser Glu Asp Leu Ala Asp Tyr Phe Cys Leu Gln
            100                 105                 110

His Trp Asn Tyr Pro Phe Thr Phe Gly Ser Gly Thr Lys Leu Glu Ile
            115                 120                 125

Lys Gly Gly Gly Ser Gly Gly Gly Ser Gly Gly Gly Ser
    130             135             140

Gln Val Gln Leu Gln Gln Ser Gly Ala Glu Leu Ala Lys Pro Gly Ala
145                 150                 155                 160

Ser Val Lys Met Ser Cys Lys Ala Ser Gly Tyr Thr Phe Thr Ser Tyr
                165                 170                 175

Trp Met Tyr Trp Leu Lys Gln Arg Pro Gly Gln Gly Leu Glu Trp Ile
            180                 185                 190

Gly Tyr Ile Asn Pro Thr Thr Gly Tyr Thr Glu Tyr Thr Gln Lys Phe
        195                 200                 205

Lys Asp Lys Ala Thr Leu Thr Ala Asp Thr Ser Ser Asn Ser Ala Tyr
210                 215                 220

Met Gln Leu Ser Ser Leu Thr Ser Glu Asp Ser Ala Val Tyr Tyr Cys
225                 230                 235                 240

Ala Arg Gly Ser Pro Tyr Tyr Asp Ser Thr Tyr Ser Tyr Trp Tyr Phe
            245                 250                 255

Asp Val Trp Gly Ala Gly Thr Thr Val Thr Val Ser Ser
            260                 265

<210> SEQ ID NO 20
<211> LENGTH: 807
<212> TYPE: DNA
<213> ORGANISM: Artificial Sequence
<220> FEATURE:
<223> OTHER INFORMATION: scFv F231 (nucleotide)

<400> SEQUENCE: 20
atggagacag acacactcct gctatgggta ctgctgctct gggttccagg ttccactggt    60
accggtgata tcgtgatgac ccagagccag aagttcatga gcacatccgt gggcgacaga   120
gtgagcatca cctgtaaggc cagccagatc gtgaggaccg ccgtggcctg gtaccagcag   180
aaacccggac aaagccccaa ggccctgatc tacctggcca gcaacagaca taccggcgtg   240
cccgatagat tcaccggcag cggcagcggc accgacttta ccctcaccat ctccaacgtg   300
cagtccgagg atctggccga ctacttctgc ctccagcact ggaactaccc ctttaccttc   360
ggcagcggca ccaagctgga gattaaaggc ggcggcggca gcggcggagg cggaagcgga   420
ggaggcggaa gccaagtgca gctccagcag agcggagccg aactggctaa gcccggcgct   480
agcgtgaaga tgagctgcaa ggccagcggc tacaccttca cctcctactg gatgtactgg   540
ctgaagcaga gacctggcca gggcctggag tggatcggct acatcaaccc caccaccggc   600
tacaccgagt acacccagaa gttcaaggat aaggccaccc tgaccgctga caccagcagc   660
aacagcgctt atatgcagct gtccagcctg accagcgagg actccgccgt gtactactgc   720
gctaggggca gcccttacta cgactccacc tactcctact ggtacttcga cgtgtggggc   780
gccggcacca cagtgacagt gagctcc                                        807

<210> SEQ ID NO 21
<211> LENGTH: 6
<212> TYPE: PRT
<213> ORGANISM: Artificial Sequence
<220> FEATURE:
<223> OTHER INFORMATION: F231 LCDR1

<400> SEQUENCE: 21

Gln Ile Val Arg Thr Ala
1               5

<210> SEQ ID NO 22
<211> LENGTH: 3
<212> TYPE: PRT
<213> ORGANISM: Artificial Sequence
<220> FEATURE:
<223> OTHER INFORMATION: F231 LCDR2

<400> SEQUENCE: 22

Leu Ala Ser
1

<210> SEQ ID NO 23
<211> LENGTH: 9
<212> TYPE: PRT
<213> ORGANISM: Artificial Sequence
<220> FEATURE:
<223> OTHER INFORMATION: F231 LCDR3

<400> SEQUENCE: 23

Leu Gln His Trp Asn Tyr Pro Phe Thr
1               5

<210> SEQ ID NO 24
<211> LENGTH: 18
<212> TYPE: DNA
<213> ORGANISM: Artificial Sequence
<220> FEATURE:
<223> OTHER INFORMATION: F231 LCDR1 (nucleotide)

<400> SEQUENCE: 24
cagatcgtga ggaccgcc                                                  18

<210> SEQ ID NO 25
<211> LENGTH: 9
<212> TYPE: DNA
<213> ORGANISM: Artificial Sequence
<220> FEATURE:
<223> OTHER INFORMATION: F231 LCDR2 (nucleotide)

<400> SEQUENCE: 25 ctggccagc                                                             9

<210> SEQ ID NO 26
<211> LENGTH: 27
<212> TYPE: DNA
<213> ORGANISM: Artificial Sequence
<220> FEATURE:
<223> OTHER INFORMATION: F231 LCDR3 (nucleotide)

<400> SEQUENCE: 26
ctccagcact ggaactaccc ctttacc                                        27

<210> SEQ ID NO 27
<211> LENGTH: 107
<212> TYPE: PRT
<213> ORGANISM: Artificial Sequence
<220> FEATURE:
<223> OTHER INFORMATION: F231 VL

<400> SEQUENCE: 27

Asp Ile Val Met Thr Gln Ser Gln Lys Phe Met Ser Thr Ser Val Gly
1               5                   10                  15

Asp Arg Val Ser Ile Thr Cys Lys Ala Ser Gln Ile Val Arg Thr Ala
            20                  25                  30

Val Ala Trp Tyr Gln Gln Lys Pro Gly Gln Ser Pro Lys Ala Leu Ile

```
                35                  40                  45
Tyr Leu Ala Ser Asn Arg His Thr Gly Val Pro Asp Arg Phe Thr Gly
        50                  55                  60

Ser Gly Ser Gly Thr Asp Phe Thr Leu Thr Ile Ser Asn Val Gln Ser
65                  70                  75                  80

Glu Asp Leu Ala Asp Tyr Phe Cys Leu Gln His Trp Asn Tyr Pro Phe
                85                  90                  95

Thr Phe Gly Ser Gly Thr Lys Leu Glu Ile Lys
            100                 105

<210> SEQ ID NO 28
<211> LENGTH: 321
<212> TYPE: DNA
<213> ORGANISM: Artificial Sequence
<220> FEATURE:
<223> OTHER INFORMATION: F231 VL (nucleotide)

<400> SEQUENCE: 28
gatatcgtga tgacccagag ccagaagttc atgagcacat ccgtgggcga cagagtgagc     60
atcacctgta aggccagcca gatcgtgagg accgccgtgg cctggtacca gcagaaaccc    120
ggacaaagcc ccaaggccct gatctacctg gccagcaaca gacataccgg cgtgcccgat    180
agattcaccg gcagcggcag cggcaccgac tttacccctca ccatctccaa cgtgcagtcc    240
gaggatctgg ccgactactt ctgcctccag cactggaact accccttttac cttcggcagc    300 ggcaccaagc tggagattaa a                                               321

<210> SEQ ID NO 29
<211> LENGTH: 8
<212> TYPE: PRT
<213> ORGANISM: Artificial Sequence
<220> FEATURE:
<223> OTHER INFORMATION: F231 HCDR1

<400> SEQUENCE: 29

Gly Tyr Thr Phe Thr Ser Tyr Trp
1               5

<210> SEQ ID NO 30
<211> LENGTH: 8
<212> TYPE: PRT
<213> ORGANISM: Artificial Sequence
<220> FEATURE:
<223> OTHER INFORMATION: F231 HCDR2

<400> SEQUENCE: 30

Ile Asn Pro Thr Thr Gly Tyr Thr
1               5

<210> SEQ ID NO 31
<211> LENGTH: 18
<212> TYPE: PRT
<213> ORGANISM: Artificial Sequence
<220> FEATURE:
<223> OTHER INFORMATION: F231 HCDR3

<400> SEQUENCE: 31

Ala Arg Gly Ser Pro Tyr Tyr Asp Ser Thr Tyr Ser Tyr Trp Tyr Phe
1               5                   10                  15

Asp Val

<210> SEQ ID NO 32
```

```
<210> SEQ ID NO 32
<211> LENGTH: 24
<212> TYPE: DNA
<213> ORGANISM: Artificial Sequence
<220> FEATURE:
<223> OTHER INFORMATION: F231 HCDR1 (nucleotide)

<400> SEQUENCE: 32
ggctacacct tcacctccta ctgg                                          24

<210> SEQ ID NO 33
<211> LENGTH: 24
<212> TYPE: DNA
<213> ORGANISM: Artificial Sequence
<220> FEATURE:
<223> OTHER INFORMATION: F231 HCDR2 (nucleotide)

<400> SEQUENCE: 33
atcaacccca ccaccggcta cacc                                          24

<210> SEQ ID NO 34
<211> LENGTH: 54
<212> TYPE: DNA
<213> ORGANISM: Artificial Sequence
<220> FEATURE:
<223> OTHER INFORMATION: F231 HCDR3 (nucleotide)

<400> SEQUENCE: 34
gctaggggca gcccttacta cgactccacc tactcctact ggtacttcga cgtg         54

<210> SEQ ID NO 35
<211> LENGTH: 125
<212> TYPE: PRT
<213> ORGANISM: Artificial Sequence
<220> FEATURE:
<223> OTHER INFORMATION: F231 VH

<400> SEQUENCE: 35

Gln Val Gln Leu Gln Gln Ser Gly Ala Glu Leu Ala Lys Pro Gly Ala
1               5                   10                  15

Ser Val Lys Met Ser Cys Lys Ala Ser Gly Tyr Thr Phe Thr Ser Tyr
                20                  25                  30

Trp Met Tyr Trp Leu Lys Gln Arg Pro Gly Gln Gly Leu Glu Trp Ile
            35                  40                  45

Gly Tyr Ile Asn Pro Thr Thr Gly Tyr Thr Glu Tyr Thr Gln Lys Phe
        50                  55                  60

Lys Asp Lys Ala Thr Leu Thr Ala Asp Thr Ser Ser Asn Ser Ala Tyr
65                  70                  75                  80

Met Gln Leu Ser Ser Leu Thr Ser Glu Asp Ser Ala Val Tyr Tyr Cys
                85                  90                  95

Ala Arg Gly Ser Pro Tyr Tyr Asp Ser Thr Tyr Ser Tyr Trp Tyr Phe
            100                 105                 110

Asp Val Trp Gly Ala Gly Thr Thr Val Thr Val Ser Ser
        115                 120                 125

<210> SEQ ID NO 36
<211> LENGTH: 375
<212> TYPE: DNA
<213> ORGANISM: Artificial Sequence
<220> FEATURE:
<223> OTHER INFORMATION: F231 VH (nucleotide)

<400> SEQUENCE: 36
caagtgcagc tccagcagag cggagccgaa ctggctaagc ccggcgctag cgtgaagatg   60
```
agctgcaagg ccagcggcta ccttcacc tcctactgga tgtactggct gaagcagaga    120
cctggccagg gcctggagtg gatcggctac atcaacccca ccaccggcta caccgagtac    180
acccagaagt tcaaggataa ggccaccctg accgctgaca ccagcagcaa cagcgcttat    240
atgcagctgt ccagcctgac agcgaggac tccgccgtgt actactgcgc taggggcagc    300
ccttactacg actccaccta ctcctactgg tacttcgacg tgtggggcgc cggcaccaca    360
gtgacagtga gctcc    375

<210> SEQ ID NO 37
<211> LENGTH: 264
<212> TYPE: PRT
<213> ORGANISM: Artificial Sequence
<220> FEATURE:
<223> OTHER INFORMATION: scFv 20

<400> SEQUENCE: 37

Met Glu Thr Asp Thr Leu Leu Leu Trp Val Leu Leu Trp Val Pro
1               5                   10                  15

Gly Ser Thr Gly Thr Gly Gln Ile Val Leu Ser Gln Ser Pro Ala Ile
            20                  25                  30

Leu Ser Ala Ser Pro Gly Glu Lys Val Thr Met Thr Cys Arg Ala Ser
        35                  40                  45

Ser Ser Val Ser Tyr Ile His Trp Phe Gln Gln Lys Pro Gly Ser Ser
    50                  55                  60

Pro Lys Pro Trp Ile Tyr Ala Thr Ser Asn Leu Ala Ser Gly Val Pro
65                  70                  75                  80

Val Arg Phe Ser Gly Ser Gly Ser Gly Thr Ser Tyr Ser Leu Thr Ile
                85                  90                  95

Ser Arg Val Glu Ala Glu Asp Ala Ala Thr Tyr Tyr Cys Gln Gln Trp
            100                 105                 110

Thr Ser Asn Pro Pro Thr Phe Gly Gly Gly Thr Lys Leu Glu Ile Lys
        115                 120                 125

Gly Gly Gly Gly Ser Gly Gly Gly Gly Ser Gly Gly Gly Gly Ser Gln
    130                 135                 140

Val Gln Leu Gln Gln Pro Gly Ala Glu Leu Val Lys Pro Gly Ala Ser
145                 150                 155                 160

Val Lys Met Ser Cys Lys Ala Ser Gly Tyr Thr Phe Thr Ser Tyr Asn
                165                 170                 175

Met His Trp Val Lys Gln Thr Pro Gly Arg Gly Leu Glu Trp Ile Gly
            180                 185                 190

Ala Ile Tyr Pro Gly Asn Gly Asp Thr Ser Tyr Asn Gln Lys Phe Lys
        195                 200                 205

Gly Lys Ala Thr Leu Thr Ala Asp Lys Ser Ser Ser Thr Ala Tyr Met
    210                 215                 220

Gln Leu Ser Ser Leu Thr Ser Glu Asp Ser Ala Val Tyr Tyr Cys Ala
225                 230                 235                 240

Arg Ser Thr Tyr Tyr Gly Gly Asp Trp Tyr Phe Asn Val Trp Gly Ala
                245                 250                 255

Gly Thr Thr Val Thr Val Ser Ala
            260

<210> SEQ ID NO 38
<211> LENGTH: 45
<212> TYPE: PRT
<213> ORGANISM: Artificial Sequence

```
<220> FEATURE:
<223> OTHER INFORMATION: hinge region

<400> SEQUENCE: 38

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 39
<211> LENGTH: 135
<212> TYPE: DNA
<213> ORGANISM: Artificial Sequence
<220> FEATURE:
<223> OTHER INFORMATION: hinge region (nucleotide)

<400> SEQUENCE: 39
actacaactc cagctccacg accaccaaca cctgctccaa ccatcgcttc gcagcctctg      60
tccctgcgcc agaggcatg ccggccagct gcaggaggtg cagtgcacac gagggggctg     120
gacttcgcct gtgat                                                     135

<210> SEQ ID NO 40
<211> LENGTH: 24
<212> TYPE: PRT
<213> ORGANISM: Artificial Sequence
<220> FEATURE:
<223> OTHER INFORMATION: transmembrane domain

<400> SEQUENCE: 40

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 41
<211> LENGTH: 72
<212> TYPE: DNA
<213> ORGANISM: Artificial Sequence
<220> FEATURE:
<223> OTHER INFORMATION: transmembrane domain (nucleotide)

<400> SEQUENCE: 41
atctacatct gggcgccctt ggccgggact tgtggggtcc ttctcctgtc actggttatc      60
accctttact gc                                                          72

<210> SEQ ID NO 42
<211> LENGTH: 42
<212> TYPE: PRT
<213> ORGANISM: Artificial Sequence
<220> FEATURE:
<223> OTHER INFORMATION: 4-1BB co-stimulatory domain

<400> SEQUENCE: 42

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40
```

<210> SEQ ID NO 43
<211> LENGTH: 126
<212> TYPE: DNA
<213> ORGANISM: Artificial Sequence
<220> FEATURE:
<223> OTHER INFORMATION: 4-1BB costimulatory domain (nucleotide)

<400> SEQUENCE: 43

```
aaacggggca gaaagaaact cctgtatata ttcaaacaac catttatgag accagtacaa    60
actactcaag aggaagatgg ctgtagctgc cgatttccag aagaagaaga aggaggatgt   120
gaactg                                                              126
```

<210> SEQ ID NO 44
<211> LENGTH: 112
<212> TYPE: PRT
<213> ORGANISM: Artificial Sequence
<220> FEATURE:
<223> OTHER INFORMATION: CD3zeta intracellular signaling domain

<400> SEQUENCE: 44

```
Arg Val Lys Phe Ser Arg Ser Ala Asp Ala Pro Ala Tyr Gln Gln Gly
 1               5                  10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
               100                 105                 110
```

<210> SEQ ID NO 45
<211> LENGTH: 336
<212> TYPE: DNA
<213> ORGANISM: Artificial Sequence
<220> FEATURE:
<223> OTHER INFORMATION: CD3zeta intracellular signaling domain
      (nucleotide)

<400> SEQUENCE: 45

```
agagtgaagt tcagcaggag cgcagacgcc cccgcgtacc agcagggcca gaaccagctc    60
tataacgagc tcaatctagg acgaagagag gagtacgatg ttttggacaa gagacgtggc   120
cgggaccctg agatgggggg aaagccgaga aggaagaacc ctcaggaagg cctgtacaat   180
gaactgcaga agataagat ggcggaggcc tacagtgaga ttgggatgaa aggcgagcgc    240 cggagggggca aggggcacga tggcctttac cagggtctca gtacagccac caaggacacc   300
tacgacgccc ttcacatgca ggccctgccc cctcgg                             336
```

<210> SEQ ID NO 46
<211> LENGTH: 492
<212> TYPE: PRT
<213> ORGANISM: Artificial Sequence
<220> FEATURE:
<223> OTHER INFORMATION: CAR T120BBZ

<400> SEQUENCE: 46

-continued

```
Met Glu Thr Asp Thr Leu Leu Trp Val Leu Leu Leu Trp Val Pro
1               5                   10                  15

Gly Ser Thr Gly Thr Gly Asp Ile Gln Met Thr Gln Ser Pro Ser Ser
            20                  25                  30

Leu Ser Ala Ser Val Gly Asp Arg Val Thr Ile Thr Cys Lys Ala Ser
            35                  40                  45

Gln Asp Val Ser Thr Ala Val Ala Trp Tyr Gln Gln Lys Pro Gly Gln
    50                  55                  60

Ala Pro Arg Leu Leu Ile Tyr Trp Ala Ser Thr Arg His Thr Gly Val
65                  70                  75                  80

Pro Ser Arg Phe Ser Gly Ser Gly Ser Gly Thr Asp Phe Thr Leu Thr
                85                  90                  95

Ile Ser Ser Leu Gln Pro Glu Asp Phe Ala Leu Tyr Tyr Cys Gln Gln
                100                 105                 110

His Tyr Ser Thr Pro Trp Thr Phe Gly Gln Gly Thr Lys Leu Glu Ile
            115                 120                 125

Lys Gly Gly Gly Gly Ser Gly Gly Gly Gly Ser Gly Gly Gly Gly Ser
    130                 135                 140

Glu Val Gln Leu Val Glu Ser Gly Gly Gly Leu Val Gln Pro Gly Gly
145                 150                 155                 160

Ser Leu Arg Leu Ser Cys Val Ala Ser Gly Phe Thr Phe Ser Asn Tyr
                165                 170                 175

Trp Met Asn Trp Val Arg Gln Ala Pro Gly Lys Gly Leu Glu Trp Val
            180                 185                 190

Ala Glu Ile Arg Leu Lys Ser Asn Asn Tyr Ala Thr His Tyr Ala Glu
            195                 200                 205

Ser Val Lys Gly Arg Phe Thr Ile Ser Arg Asp Asp Ser Lys Asn Thr
210                 215                 220

Val Tyr Leu Gln Met Asn Ser Leu Arg Ala Glu Asp Thr Ala Val Tyr
225                 230                 235                 240

Tyr Cys Thr Arg Asn Gly Asn Tyr Val Asp Tyr Ala Met Asp Tyr Trp
            245                 250                 255

Gly Gln Gly Thr Leu Val Thr Val Ser Ser Ala Ala Thr Thr Thr
            260                 265                 270

Pro Ala Pro Arg Pro Pro Thr Pro Ala Pro Thr Ile Ala Ser Gln Pro
            275                 280                 285

Leu Ser Leu Arg Pro Glu Ala Cys Arg Pro Ala Ala Gly Gly Ala Val
    290                 295                 300

His Thr Arg Gly Leu Asp Phe Ala Cys Asp Ile Tyr Ile Trp Ala Pro
305                 310                 315                 320

Leu Ala Gly Thr Cys Gly Val Leu Leu Leu Ser Leu Val Ile Thr Leu
            325                 330                 335

Tyr Cys Lys Arg Gly Arg Lys Lys Leu Leu Tyr Ile Phe Lys Gln Pro
            340                 345                 350

Phe Met Arg Pro Val Gln Thr Thr Gln Glu Glu Asp Gly Cys Ser Cys
            355                 360                 365

Arg Phe Pro Glu Glu Glu Glu Gly Gly Cys Glu Leu Arg Val Lys Phe
            370                 375                 380

Ser Arg Ser Ala Asp Ala Pro Ala Tyr Gln Gln Gly Gln Asn Gln Leu
385                 390                 395                 400

Tyr Asn Glu Leu Asn Leu Gly Arg Arg Glu Glu Tyr Asp Val Leu Asp
                405                 410                 415
```

|     |     |     |     |     |     |     |     |     |     |     |     |
| --- | --- | --- | --- | --- | --- | --- | --- | --- | --- | --- | --- |
| Lys | Arg | Arg | Gly | Arg | Asp | Pro | Glu | Met | Gly | Lys | Pro | Arg | Arg | Lys |
|     |     |     | 420 |     |     |     | 425 |     |     |     | 430 |

| Asn | Pro | Gln | Glu | Gly | Leu | Tyr | Asn | Glu | Leu | Gln | Lys | Asp | Lys | Met | Ala |
|     |     |     | 435 |     |     |     | 440 |     |     |     | 445 |

| Glu | Ala | Tyr | Ser | Glu | Ile | Gly | Met | Lys | Gly | Glu | Arg | Arg | Arg | Gly | Lys |
|     |     |     | 450 |     |     |     | 455 |     |     |     | 460 |

| Gly | His | Asp | Gly | Leu | Tyr | Gln | Gly | Leu | Ser | Thr | Ala | Thr | Lys | Asp | Thr |
| 465 |     |     |     | 470 |     |     |     | 475 |     |     |     | 480 |

| Tyr | Asp | Ala | Leu | His | Met | Gln | Ala | Leu | Pro | Pro | Arg |
|     |     |     | 485 |     |     |     | 490 |

<210> SEQ ID NO 47
<211> LENGTH: 1479
<212> TYPE: DNA
<213> ORGANISM: Artificial Sequence
<220> FEATURE:
<223> OTHER INFORMATION: CAR T120BBZ (nucleotide)

<400> SEQUENCE: 47

```
atggagacag acacactcct gctatgggta ctgctgctct gggttccagg ttccactggt      60
accggtgata tccagatgac ccagtccccg agctccctgt ccgcctctgt gggcgatagg     120
gtcactatca cctgcaaagc cagtcaggat gtgagcactg ctgtagcctg gtatcaacag     180
aaacccggac aggccccgcg tctgctgatt tactgggcat ccaccgtca taccggagtc      240
ccttctcgct tctctggttc cggctctggg acggatttca ctctgaccat cagctccctg     300
cagccggaag acttcgcact gtattactgt cagcaacact atagcactcc gtggacgttc     360
ggacagggta ccaagctgga gatcaaaggc ggaggcggat caggcggcgg tggatctggg     420
ggtggcggat ctgaagtaca gctggtggag tctggaggag gcttggtgca acctggagga     480
tccctgcgtc tctcctgtgt tgcctctgga ttcactttca gtaactactg gatgaactgg     540
gtccgccagg cgccaggtaa ggggcttgag tgggttgctg aaattagatt gaaatctaat     600
aattatgcaa cacattatgc ggagtctgtg aagggaggt tcaccatctc aagagatgat     660
tccaaaaata ccgtctacct gcaaatgaac agcttaagag ctgaagacac tgcggtttat     720
tactgtaccc ggaacggtaa ttacgtggat atgctatgg actactgggg tcaaggaacc     780
ctggtcaccg tctcctcagc ggccgcaact acaactccag ctccacgacc accaacacct     840
gctccaacca tcgcttcgca gcctctgtcc ctgcgcccag gcatgccg ccagctgca      900
ggaggtgcag tgcacacgag ggggctggac ttcgcctgtg atatctacat ctgggcgccc    960
ttggccggga cttgtggggt ccttctcctg tcactggtta tcacccttta ctgcaaacgg   1020
ggcagaaaga aactcctgta tatattcaaa caaccattta tgagaccagt acaaactact   1080
caagaggaag atggctgtag ctgccgattt ccagaagaag aagaaggagg atgtgaactg   1140
agagtgaagt tcagcaggag cgcagacgcc cccgcgtacc agcagggcca gaaccagctc   1200
tataacgagc tcaatctagg acgaagagag gagtacgatg ttttggacaa gagacgtggc   1260
cgggaccctg agatgggggg aaagccgaga aggaagaacc ctcaggaagg cctgtacaat   1320
gaactgcaga agataagat ggcggaggcc tacagtgaga ttgggatgaa aggcgagcgc   1380
cggaggggca aggggcacga tggcctttac cagggtctca gtacagccac caaggacacc   1440
tacgacgccc ttcacatgca ggccctgccc ctcggtaa                           1479
```

<210> SEQ ID NO 48
<211> LENGTH: 490
<212> TYPE: PRT

<213> ORGANISM: Artificial Sequence
<220> FEATURE:
<223> OTHER INFORMATION: CAR 20BBZ

<400> SEQUENCE: 48

```
Met Glu Thr Asp Thr Leu Leu Leu Trp Val Leu Leu Leu Trp Val Pro
1               5                   10                  15

Gly Ser Thr Gly Thr Gly Gln Ile Val Leu Ser Gln Ser Pro Ala Ile
            20                  25                  30

Leu Ser Ala Ser Pro Gly Glu Lys Val Thr Met Thr Cys Arg Ala Ser
        35                  40                  45

Ser Ser Val Ser Tyr Ile His Trp Phe Gln Gln Lys Pro Gly Ser Ser
    50                  55                  60

Pro Lys Pro Trp Ile Tyr Ala Thr Ser Asn Leu Ala Ser Gly Val Pro
65                  70                  75                  80

Val Arg Phe Ser Gly Ser Gly Ser Gly Thr Ser Tyr Ser Leu Thr Ile
                85                  90                  95

Ser Arg Val Glu Ala Glu Asp Ala Ala Thr Tyr Tyr Cys Gln Gln Trp
            100                 105                 110

Thr Ser Asn Pro Pro Thr Phe Gly Gly Gly Thr Lys Leu Glu Ile Lys
        115                 120                 125

Gly Gly Gly Gly Ser Gly Gly Gly Gly Ser Gly Gly Gly Gly Ser Gln
    130                 135                 140

Val Gln Leu Gln Gln Pro Gly Ala Glu Leu Val Lys Pro Gly Ala Ser
145                 150                 155                 160

Val Lys Met Ser Cys Lys Ala Ser Gly Tyr Thr Phe Thr Ser Tyr Asn
                165                 170                 175

Met His Trp Val Lys Gln Thr Pro Gly Arg Gly Leu Glu Trp Ile Gly
            180                 185                 190

Ala Ile Tyr Pro Gly Asn Gly Asp Thr Ser Tyr Asn Gln Lys Phe Lys
        195                 200                 205

Gly Lys Ala Thr Leu Thr Ala Asp Lys Ser Ser Ser Thr Ala Tyr Met
    210                 215                 220

Gln Leu Ser Ser Leu Thr Ser Glu Asp Ser Ala Val Tyr Tyr Cys Ala
225                 230                 235                 240

Arg Ser Thr Tyr Tyr Gly Gly Asp Trp Tyr Phe Asn Val Trp Gly Ala
                245                 250                 255

Gly Thr Thr Val Thr Val Ser Ala Ala Ala Thr Thr Thr Pro Ala
            260                 265                 270

Pro Arg Pro Pro Thr Pro Ala Pro Thr Ile Ala Ser Gln Pro Leu Ser
        275                 280                 285

Leu Arg Pro Glu Ala Cys Arg Pro Ala Ala Gly Gly Ala Val His Thr
    290                 295                 300

Arg Gly Leu Asp Phe Ala Cys Asp Ile Tyr Ile Trp Ala Pro Leu Ala
305                 310                 315                 320

Gly Thr Cys Gly Val Leu Leu Leu Ser Leu Val Ile Thr Leu Tyr Cys
                325                 330                 335

Lys Arg Gly Arg Lys Lys Leu Leu Tyr Ile Phe Lys Gln Pro Phe Met
            340                 345                 350

Arg Pro Val Gln Thr Thr Gln Glu Glu Asp Gly Cys Ser Cys Arg Phe
        355                 360                 365

Pro Glu Glu Glu Glu Gly Gly Cys Glu Leu Arg Val Lys Phe Ser Arg
    370                 375                 380

Ser Ala Asp Ala Pro Ala Tyr Gln Gln Gly Gln Asn Gln Leu Tyr Asn
```

```
               385                 390                 395                 400
Glu Leu Asn Leu Gly Arg Arg Glu Tyr Asp Val Leu Asp Lys Arg
                    405                 410                 415

Arg Gly Arg Asp Pro Glu Met Gly Gly Lys Pro Arg Arg Lys Asn Pro
                    420                 425                 430

Gln Glu Gly Leu Tyr Asn Glu Leu Gln Lys Asp Lys Met Ala Glu Ala
                    435                 440                 445

Tyr Ser Glu Ile Gly Met Lys Gly Glu Arg Arg Arg Gly Lys Gly His
                    450                 455                 460

Asp Gly Leu Tyr Gln Gly Leu Ser Thr Ala Thr Lys Asp Thr Tyr Asp
465                 470                 475                 480

Ala Leu His Met Gln Ala Leu Pro Pro Arg
                    485                 490

<210> SEQ ID NO 49
<211> LENGTH: 1473
<212> TYPE: DNA
<213> ORGANISM: Artificial Sequence
<220> FEATURE:
<223> OTHER INFORMATION: CAR 20BBZ (nucleotide)

<400> SEQUENCE: 49
atggagacag acacactcct gctatgggta ctgctgctct gggttccagg ttccactggt      60
accggtcaaa ttgttctctc ccagtctcca gcaatcctgt ctgcatctcc aggggagaag     120
gtcacaatga cttgcagggc cagctcaagt gtaagttaca tccactggtt ccagcagaag     180
ccaggctctt cccccaaacc ctggatttat gccacatcca acctggcttc tggagtccct     240
gttcgcttca gtggcagtgg gtctgggact tcttactctc tcacaatcag cagagtggag     300
gctgaagatg ctgccactta ttactgccag cagtggacta gtaacccacc cacgttcgga     360
ggggggacca agctggaaat caaaggcgga ggcggatcag gcggcggtgg atctggggt      420
ggcggatctc aggtacaact gcagcagcct ggggctgagc tggtgaagcc tggggcctca     480
gtgaagatgt cctgcaaggc ttctggctac acatttacca gttacaatat gcactgggta     540
aaacagacac ctggtcgggg cctggaatgg attggagcta tttatcccgg aaatggtgat     600
acttcctaca atcagaagtt caaaggcaag gccacattga ctgcagacaa atcctccagc     660
acagcctaca tgcagctcag cagcctgaca tctgaggact ctgcggtcta ttactgtgca     720
agatcgactt actacggcgg tgactggtac ttcaatgtct ggggcgcagg gaccacggtc     780
accgtttctg cagcggccgc aactacaact ccagctccac gaccaccaac acctgctcca     840
accatcgctt cgcagcctct gtccctgcgc ccagaggcat gccggccagc tgcaggaggt     900
gcagtgcaca cgagggggct ggacttcgcc tgtgatatct acatctgggc gcccttggcc     960
gggacttgtg ggtccttctc ctgtcactgg ttatcaccc tttactgcaa acggggcaga    1020
aagaaactcc tgtatatatt caaacaacca tttatgagac cagtacaaac tactcaagag    1080
gaagatggct gtagctgccg atttccagaa gaagaagaag aggatgtgaa ctgagagtg     1140
aagttcagca ggagcgcaga cgccccgcg taccagcagg ccagaaccag ctctataac     1200
gagctcaatc taggacgaag agaggagtac gatgttttgg acaagagacg tggccgggac    1260
cctgagatgg ggggaaagcc gagaaggaag aaccctcagg aaggcctgta caatgaactg    1320
cagaaagata agatggcgga ggcctacagt gagattggga tgaaaggcga gcgccggagg    1380
ggcaagggc acgatggcct ttaccagggt ctcagtacag ccaccaagga cacctacgac    1440
gcccttcaca tgcaggcccct gccccctcgg taa                                 1473
```

<210> SEQ ID NO 50
<211> LENGTH: 497
<212> TYPE: PRT
<213> ORGANISM: Artificial Sequence
<220> FEATURE:
<223> OTHER INFORMATION: CAR F231mBBZ

<400> SEQUENCE: 50

```
Met Glu Thr Asp Thr Leu Leu Leu Trp Val Leu Leu Leu Trp Val Pro
1               5                   10                  15

Gly Ser Thr Gly Thr Gly Asp Ile Val Met Thr Gln Ser Gln Lys Phe
            20                  25                  30

Met Ser Thr Ser Val Gly Asp Arg Val Ser Ile Thr Cys Lys Ala Ser
        35                  40                  45

Gln Ile Val Arg Thr Ala Val Ala Trp Tyr Gln Lys Pro Gly Gln
    50                  55                  60

Ser Pro Lys Ala Leu Ile Tyr Leu Ala Ser Asn Arg His Thr Gly Val
65                  70                  75                  80

Pro Asp Arg Phe Thr Gly Ser Gly Ser Gly Thr Asp Phe Thr Leu Thr
                85                  90                  95

Ile Ser Asn Val Gln Ser Glu Asp Leu Ala Asp Tyr Phe Cys Leu Gln
            100                 105                 110

His Trp Asn Tyr Pro Phe Thr Phe Gly Ser Gly Thr Lys Leu Glu Ile
        115                 120                 125

Lys Gly Gly Gly Gly Ser Gly Gly Gly Ser Gly Gly Gly Gly Ser
    130                 135                 140

Gln Val Gln Leu Gln Gln Ser Gly Ala Glu Leu Ala Lys Pro Gly Ala
145                 150                 155                 160

Ser Val Lys Met Ser Cys Lys Ala Ser Gly Tyr Thr Phe Thr Ser Tyr
                165                 170                 175

Trp Met Tyr Trp Leu Lys Gln Arg Pro Gly Gln Gly Leu Glu Trp Ile
            180                 185                 190

Gly Tyr Ile Asn Pro Thr Thr Gly Tyr Thr Glu Tyr Thr Gln Lys Phe
        195                 200                 205

Lys Asp Lys Ala Thr Leu Thr Ala Asp Thr Ser Ser Asn Ser Ala Tyr
    210                 215                 220

Met Gln Leu Ser Ser Leu Thr Ser Glu Asp Ser Ala Val Tyr Tyr Cys
225                 230                 235                 240

Ala Arg Gly Ser Pro Tyr Tyr Asp Ser Thr Tyr Ser Tyr Trp Tyr Phe
                245                 250                 255

Asp Val Trp Gly Ala Gly Thr Thr Val Thr Val Ser Ser Ala Ala Ala
            260                 265                 270

Thr Thr Thr Lys Pro Val Leu Arg Thr Pro Ser Pro Val His Pro Thr
        275                 280                 285

Gly Thr Ser Gln Pro Gln Arg Pro Glu Asp Cys Arg Pro Arg Gly Ser
    290                 295                 300

Val Lys Gly Thr Gly Leu Asp Phe Ala Cys Asp Ile Tyr Ile Trp Ala
305                 310                 315                 320

Pro Leu Ala Gly Ile Cys Val Ala Leu Leu Ser Leu Ile Ile Thr
                325                 330                 335

Leu Ile Cys Lys Trp Ile Arg Lys Lys Phe Pro His Ile Phe Lys Gln
            340                 345                 350

Pro Phe Lys Lys Thr Thr Gly Ala Ala Gln Glu Glu Asp Ala Cys Ser
        355                 360                 365
```

```
Cys Arg Cys Pro Gln Glu Glu Gly Gly Gly Gly Tyr Glu Leu
        370                 375                 380

Arg Ala Lys Phe Ser Arg Ser Ala Glu Thr Ala Ala Asn Leu Gln Asp
385                 390                 395                 400

Pro Asn Gln Leu Tyr Asn Glu Leu Asn Leu Gly Arg Arg Glu Glu Tyr
            405                 410                 415

Asp Val Leu Glu Lys Lys Arg Ala Arg Asp Pro Glu Met Gly Gly Lys
        420                 425                 430

Gln Gln Arg Arg Arg Asn Pro Gln Glu Gly Val Tyr Asn Ala Leu Gln
            435                 440                 445

Lys Asp Lys Met Ala Glu Ala Tyr Ser Glu Ile Gly Thr Lys Gly Glu
        450                 455                 460

Arg Arg Arg Gly Lys Gly His Asp Gly Leu Tyr Gln Gly Leu Ser Thr
465                 470                 475                 480

Ala Thr Lys Asp Thr Tyr Asp Ala Leu His Met Gln Thr Leu Ala Pro
            485                 490                 495

Arg
```

<210> SEQ ID NO 51
<211> LENGTH: 1494
<212> TYPE: DNA
<213> ORGANISM: Artificial Sequence
<220> FEATURE:
<223> OTHER INFORMATION: CAR F231mBBZ (nucleotide)

<400> SEQUENCE: 51

```
atggagacag acacactcct gctatgggta ctgctgctct gggttccagg ttccactggt      60
accggtgata tcgtgatgac ccagagccag aagttcatga gcacatccgt gggcgacaga     120
gtgagcatca cctgtaaggc cagccagatc gtgaggaccg ccgtggcctg gtaccagcag     180
aaacccggac aaagccccaa ggccctgatc tacctggcca gcaacagaca taccggcgtg     240
cccgatagat tcaccggcag cggcagcggc accgacttta ccctcaccat ctccaacgtg     300
cagtccgagg atctggccga ctacttctgc ctccagcact ggaactaccc ctttaccttc     360
ggcagcggca ccaagctgga gattaaaggc ggcggcggca gcggcggagg cggaagcgga     420
ggaggcggaa gccaagtgca gctccagcag agcggagccg aactggctaa gcccggcgct     480
agcgtgaaga tgagctgcaa ggccagcggc tacaccttca cctcctactg gatgtactgg     540
ctgaagcaga gacctggcca gggcctggag tggatcggct acatcaaccc caccaccggc     600
tacaccgagt acaaccagaa gttcaaggat aaggccaccc tgaccgctga caccagcagc     660
aacagcgctt atatgcagct gtccagcctg accagcgagg actccgccgt gtactactgc     720
gctaggggca gccttactac gactccacc tactcctact ggtacttcga cgtgtggggc     780
gccggcacca cagtgacagt gagctccgcg ccgcaactac taccaagcc agtgctgcga     840
actccctcac ctgtgcaccc taccgggaca tctcagcccc agagaccaga gattgtcgg     900
ccccgtggct cagtgaaggg gaccggattg gacttcgcct gtgatattta catctgggca     960
cccttggccg gaatctgcgt ggcccttctg ctgtccttga tcatcactct catctgcaaa    1020
tggatcagga aaaaattccc ccacatattc aagcaaccat ttaagaagac cactggagca    1080
gctcaagagg aagatgcttg tagctgccga tgtccacagg aagaagaagg aggaggagga    1140
ggctatgagc tgagagcaaa attcagcagg agtgcagaga ctgctgccaa cctgcaggac    1200
cccaaccagc tctacaatga gctcaatcta gggcgaagag aggaatatga cgtcttggag    1260
```

```
aagaagcggg ctcgcgaccc agagatggga ggcaaacagc agaggaggag gaacccccag   1320
gaaggcgtat acaatgcact gcagaaagac aagatggcag aagcctacag tgagatcggc   1380
acaaaaggcg agaggcggag aggcaagggg cacgatggcc tttaccaggg tctcagcact   1440
gccaccaagg acacctatga tgccctgcat atgcagaccc tggcccctcg ctaa         1494
```

<210> SEQ ID NO 52
<211> LENGTH: 15
<212> TYPE: PRT
<213> ORGANISM: Artificial Sequence
<220> FEATURE:
<223> OTHER INFORMATION: VL-VH linker peptide

<400> SEQUENCE: 52

Gly Gly Gly Gly Ser Gly Gly Gly Gly Ser Gly Gly Gly Gly Ser
1               5                   10                  15

<210> SEQ ID NO 53
<211> LENGTH: 45
<212> TYPE: DNA
<213> ORGANISM: Artificial Sequence
<220> FEATURE:
<223> OTHER INFORMATION: linker peptide (VL-VH) (nucleotide)

<400> SEQUENCE: 53

```
ggcggaggcg gatcaggcgg cggtggatct gggggtggcg gatct                    45
```

<210> SEQ ID NO 54
<211> LENGTH: 223
<212> TYPE: PRT
<213> ORGANISM: Artificial Sequence
<220> FEATURE:
<223> OTHER INFORMATION: BBZ

<400> SEQUENCE: 54

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
                20                  25                  30

Gly Ala Val His Thr Arg Gly Leu Asp Phe Ala Cys Asp Ile Tyr Ile
            35                  40                  45

Trp Ala Pro Leu Ala Gly Thr Cys Gly Val Leu Leu Leu Ser Leu Val
        50                  55                  60

Ile Thr Leu Tyr Cys Lys Arg Gly Arg Lys Lys Leu Leu Tyr Ile Phe
65                  70                  75                  80

Lys Gln Pro Phe Met Arg Pro Val Gln Thr Thr Gln Glu Glu Asp Gly
                85                  90                  95

Cys Ser Cys Arg Phe Pro Glu Glu Glu Glu Gly Gly Cys Glu Leu Arg
            100                 105                 110

Val Lys Phe Ser Arg Ser Ala Asp Ala Pro Ala Tyr Gln Gln Gly Gln
        115                 120                 125

Asn Gln Leu Tyr Asn Glu Leu Asn Leu Gly Arg Arg Glu Glu Tyr Asp
    130                 135                 140

Val Leu Asp Lys Arg Arg Gly Arg Asp Pro Glu Met Gly Gly Lys Pro
145                 150                 155                 160

Arg Arg Lys Asn Pro Gln Glu Gly Leu Tyr Asn Glu Leu Gln Lys Asp
                165                 170                 175

Lys Met Ala Glu Ala Tyr Ser Glu Ile Gly Met Lys Gly Glu Arg Arg
            180                 185                 190

Arg Gly Lys Gly His Asp Gly Leu Tyr Gln Gly Leu Ser Thr Ala Thr
    195                 200                 205

Lys Asp Thr Tyr Asp Ala Leu His Met Gln Ala Leu Pro Pro Arg
    210                 215                 220

<210> SEQ ID NO 55
<211> LENGTH: 672
<212> TYPE: DNA
<213> ORGANISM: Artificial Sequence
<220> FEATURE:
<223> OTHER INFORMATION: BBZ (nucleotide)

<400> SEQUENCE: 55
actacaactc cagctccacg accaccaaca cctgctccaa ccatcgcttc gcagcctctg     60
tccctgcgcc cagaggcatg ccggccagct gcaggaggtg cagtgcacac gagggggctg    120
gacttcgcct gtgatatcta catctgggcg cccttggccg ggacttgtgg ggtccttctc    180
ctgtcactgg ttatcaccct ttactgcaaa cggggcagaa agaaactcct gtatatattc    240
aaacaaccat ttatgagacc agtacaaact actcaagagg aagatggctg tagctgccga    300
tttccagaag aagaagaagg aggatgtgaa ctgagagtga agttcagcag gagcgcagac    360 gccccccgcgt accagcaggg ccagaaccag ctctataacg agctcaatct aggacgaaga    420
gaggagtacg atgttttgga caagagacgt ggccgggacc ctgagatggg gggaaagccg    480
agaaggaaga accctcagga aggcctgtac aatgaactgc agaaagataa gatggcggag    540
gcctacagtg agattgggat gaaaggcgag cgccggaggg gcaaggggca cgatggcctt    600
taccagggtc tcagtacagc caccaaggac acctacgacg cccttcacat gcaggccctg    660
ccccctcggt aa                                                        672

<210> SEQ ID NO 56
<211> LENGTH: 225
<212> TYPE: PRT
<213> ORGANISM: Artificial Sequence
<220> FEATURE:
<223> OTHER INFORMATION: mBBZ

<400> SEQUENCE: 56

Thr Thr Thr Lys Pro Val Leu Arg Thr Pro Ser Pro Val His Pro Thr
1               5                   10                  15

Gly Thr Ser Gln Pro Gln Arg Pro Glu Asp Cys Arg Pro Arg Gly Ser
            20                  25                  30

Val Lys Gly Thr Gly Leu Asp Phe Ala Cys Asp Ile Tyr Ile Trp Ala
        35                  40                  45

Pro Leu Ala Gly Ile Cys Val Ala Leu Leu Leu Ser Leu Ile Ile Thr
    50                  55                  60

Leu Ile Cys Lys Trp Ile Arg Lys Lys Phe Pro His Ile Phe Lys Gln
65                  70                  75                  80

Pro Phe Lys Lys Thr Thr Gly Ala Ala Gln Glu Glu Asp Ala Cys Ser
                85                  90                  95

Cys Arg Cys Pro Gln Glu Glu Glu Gly Gly Gly Gly Tyr Glu Leu
                100                 105                 110

Arg Ala Lys Phe Ser Arg Ser Ala Glu Thr Ala Ala Asn Leu Gln Asp
            115                 120                 125

Pro Asn Gln Leu Tyr Asn Glu Leu Asn Leu Gly Arg Arg Glu Glu Tyr
        130                 135                 140

Asp Val Leu Glu Lys Lys Arg Ala Arg Asp Pro Glu Met Gly Gly Lys
145                 150                 155                 160

Gln Gln Arg Arg Arg Asn Pro Gln Glu Gly Val Tyr Asn Ala Leu Gln
            165                 170                 175

Lys Asp Lys Met Ala Glu Ala Tyr Ser Glu Ile Gly Thr Lys Gly Glu
        180                 185                 190

Arg Arg Arg Gly Lys Gly His Asp Gly Leu Tyr Gln Gly Leu Ser Thr
        195                 200                 205

Ala Thr Lys Asp Thr Tyr Asp Ala Leu His Met Gln Thr Leu Ala Pro
    210                 215                 220

Arg
225

<210> SEQ ID NO 57
<211> LENGTH: 678
<212> TYPE: DNA
<213> ORGANISM: Artificial Sequence
<220> FEATURE:
<223> OTHER INFORMATION: mBBZ (nucleotide)

<400> SEQUENCE: 57

```
actactacca agccagtgct gcgaactccc tcacctgtgc accctaccgg gacatctcag      60
ccccagagac cagaagattg tcggccccgt ggctcagtga aggggaccgg attggacttc     120
gcctgtgata tttacatctg ggcacccttg gccggaatct gcgtggccct tctgctgtcc     180
ttgatcatca ctctcatctg caatggatc aggaaaaaat tcccccacat attcaagcaa     240
ccatttaaga gaccactgg agcagctcaa gaggaagatg cttgtagctg ccgatgtcca     300
caggaagaag aaggaggagg aggaggctat gagctgagag caaaattcag caggagtgca     360
gagactgctg ccaacctgca ggaccccaac cagctctaca atgagctcaa tctagggcga     420
agagaggaat atgacgtctt ggagaagaag cgggctcgcg acccagagat gggaggcaaa     480
cagcagagga ggaggaaccc ccaggaaggc gtatacaatg cactgcagaa agacaagatg     540
gcagaagcct acagtgagat cggcacaaaa ggcgagaggc ggagaggcaa ggggcacgat     600
ggccttacc agggtctcag cactgccacc aaggacacct atgatgccct gcatatgcag     660
accctggccc ctcgctaa                                                   678
```

<210> SEQ ID NO 58
<211> LENGTH: 21
<212> TYPE: PRT
<213> ORGANISM: Artificial Sequence
<220> FEATURE:
<223> OTHER INFORMATION: Jalpha18 (human)

<400> SEQUENCE: 58

Arg Gly Ser Thr Leu Gly Arg Leu Tyr Phe Gly Arg Gly Thr Gln Leu
1               5                   10                  15

Thr Val Trp Pro Phe
            20

<210> SEQ ID NO 59
<211> LENGTH: 135
<212> TYPE: PRT
<213> ORGANISM: Artificial Sequence
<220> FEATURE:
<223> OTHER INFORMATION: Valpha24Jalpha18 (human)

<400> SEQUENCE: 59

Met Lys Lys His Leu Thr Thr Phe Leu Val Ile Leu Trp Leu Tyr Phe
1               5                   10                  15

```
Tyr Arg Gly Asn Gly Lys Asn Gln Val Glu Gln Ser Pro Gln Ser Leu
            20                  25                  30

Ile Ile Leu Glu Gly Lys Asn Cys Thr Leu Gln Cys Asn Tyr Thr Val
        35                  40                  45

Ser Pro Phe Ser Asn Leu Arg Trp Tyr Lys Gln Asp Thr Gly Arg Gly
50                      55                  60

Pro Val Ser Leu Thr Ile Met Thr Phe Ser Glu Asn Thr Lys Ser Asn
65                      70                  75                  80

Gly Arg Tyr Thr Ala Thr Leu Asp Ala Asp Thr Lys Gln Ser Ser Leu
                85                  90                  95

His Ile Thr Ala Ser Gln Leu Ser Asp Ser Ala Ser Tyr Ile Cys Val
            100                 105                 110

Val Ser Asp Arg Gly Ser Thr Leu Gly Arg Leu Tyr Phe Gly Arg Gly
            115                 120                 125

Thr Gln Leu Thr Val Trp Pro
            130             135
```

<210> SEQ ID NO 60
<211> LENGTH: 113
<212> TYPE: PRT
<213> ORGANISM: Artificial Sequence
<220> FEATURE:
<223> OTHER INFORMATION: Vbeta8 (mouse)

<400> SEQUENCE: 60

```
Glu Ala Ala Val Thr Gln Ser Pro Arg Asn Lys Val Ala Val Thr Gly
1               5                   10                  15

Gly Lys Val Thr Leu Ser Cys Asn Gln Thr Asn Asn His Asn Asn Met
            20                  25                  30

Tyr Trp Tyr Arg Gln Asp Thr Gly His Gly Leu Arg Leu Ile His Tyr
        35                  40                  45

Ser Tyr Gly Ala Gly Ser Thr Glu Lys Gly Asp Ile Pro Asp Gly Tyr
50                      55                  60

Lys Ala Ser Arg Pro Ser Gln Glu Asn Phe Ser Leu Ile Leu Glu Leu
65                  70                  75                      80

Ala Thr Pro Ser Gln Thr Ser Val Tyr Phe Cys Ala Ser Gly Asp Trp
                85                  90                  95

Phe Ser Gln Asn Thr Leu Tyr Phe Gly Ala Gly Thr Arg Leu Ser Val
            100                 105                 110

Leu
```

<210> SEQ ID NO 61
<211> LENGTH: 96
<212> TYPE: PRT
<213> ORGANISM: Artificial Sequence
<220> FEATURE:
<223> OTHER INFORMATION: Vbeta8 (human)

<400> SEQUENCE: 61

```
Asp Ala Gly Val Ile Gln Ser Pro Arg His Glu Val Thr Glu Met Gly
1               5                   10                  15

Gln Glu Val Thr Leu Arg Cys Lys Pro Ile Ser Gly His Asn Ser Leu
            20                  25                  30

Phe Trp Tyr Arg Gln Thr Met Met Arg Gly Leu Glu Leu Leu Ile Tyr
        35                  40                  45

Phe Asn Asn Asn Val Pro Ile Asp Asp Ser Gly Met Pro Glu Asp Arg
50                      55                  60
```

Phe Ser Ala Lys Met Pro Asn Ala Ser Phe Ser Thr Leu Lys Ile Gln
65                  70                  75                  80

Pro Ser Glu Pro Arg Asp Ser Ala Val Tyr Phe Cys Ala Ser Ser Leu
            85                  90                  95

<210> SEQ ID NO 62
<211> LENGTH: 264
<212> TYPE: PRT
<213> ORGANISM: Artificial Sequence
<220> FEATURE:
<223> OTHER INFORMATION: 1168scFv amino acid sequence

<400> SEQUENCE: 62

Met Glu Thr Asp Thr Leu Leu Leu Trp Val Leu Leu Leu Trp Val Pro
1               5                   10                  15

Gly Ser Thr Gly Thr Gly Gln Ile Val Leu Thr Gln Ser Pro Ala Ile
            20                  25                  30

Met Ser Ala Ser Pro Gly Glu Lys Val Thr Ile Ser Cys Ser Ala Ser
        35                  40                  45

Ser Ser Val Ser Tyr Ile Tyr Trp Tyr Gln Gln Lys Pro Gly Ser Ser
    50                  55                  60

Pro Lys Pro Trp Ile Tyr Arg Thr Ser Asn Leu Ala Ser Gly Val Pro
65                  70                  75                  80

Ala Arg Phe Ser Gly Ser Gly Ser Gly Thr Ser Tyr Ser Leu Thr Ile
                85                  90                  95

Ser Ser Met Glu Ala Glu Asp Ala Ala Ala Tyr Tyr Cys Gln Gln Tyr
            100                 105                 110

His Thr Tyr Pro Leu Thr Phe Gly Ala Gly Thr Lys Leu Glu Leu Lys
        115                 120                 125

Gly Gly Gly Gly Ser Gly Gly Gly Gly Ser Gly Gly Gly Gly Ser Asp
    130                 135                 140

Val Gln Leu Val Glu Ser Gly Gly Gly Leu Val Gln Pro Gly Gly Ser
145                 150                 155                 160

Arg Lys Leu Ser Cys Ala Ala Ser Gly Phe Thr Phe Ser Ser Phe Gly
                165                 170                 175

Met His Trp Val Arg Gln Val Pro Glu Lys Gly Leu Glu Trp Val Ala
            180                 185                 190

Tyr Ile Ser Ser Gly Ser Ser Thr Ile Tyr Tyr Ala Asp Thr Val Lys
        195                 200                 205

Gly Arg Phe Thr Ile Ser Arg Asp Asn Pro Lys Asn Thr Leu Phe Leu
    210                 215                 220

Gln Met Thr Ser Leu Arg Ser Glu Asp Thr Ala Met Tyr Tyr Cys Ala
225                 230                 235                 240

Arg Arg Pro Met Gly Gly Ala Gly Gly Ala Met Asp Tyr Trp Gly Gln
                245                 250                 255

Gly Thr Ser Val Thr Val Ser Ser
            260

<210> SEQ ID NO 63
<211> LENGTH: 792
<212> TYPE: DNA
<213> ORGANISM: Artificial Sequence
<220> FEATURE:
<223> OTHER INFORMATION: 1168scFv nucleotide sequence

<400> SEQUENCE: 63
atggagaccg acaccctctt attatgggtg ctgttattat gggtccccgg aagcaccgga    60

```
accggtcaga ttgtgctgac ccagagcccc gctatcatga gcgcctcccc cggcgagaag    120
gtgaccatca gctgctccgc cagcagcagc gtgagctaca tctactggta ccagcagaag    180
cctggaagca gccccaagcc ttggatctat agaacatcca atctggccag cggcgtgccc    240
gccagattta gcggctccgg cagcggcaca tcctactctc tgacaatcag ctccatggag    300
gctgaagatg ccgccgccta ctattgccag cagtaccaca cctaccctct gacatttggc    360
gccggcacca gctggagct caaaggcggc ggaggaagcg gaggaggagg cagcggagga    420
ggcggaagcg atgtgcagct ggtggaatcc ggaggcggac tggtgcaacc cggcggctct    480
aggaagctga gctgcgctgc cagcggcttc accttctcct ccttcggcat gcactgggtg    540
agacaagtgc ccgagaaagg actggagtgg gtggcctaca tctcctccgg cagctccacc    600
atctactacg ccgacaccgt caagggaaga ttcaccatct ctagggacaa ccccaagaac    660
acactgtttc tgcagatgac atctctgaga gcgaggaca cagccatgta ctactgcgcc    720
agaagaccta tgggcggagc tggcggcgcc atggattact ggggacaagg cacctccgtg    780
accgtgtcca gc                                                        792
```

<210> SEQ ID NO 64
<211> LENGTH: 10
<212> TYPE: PRT
<213> ORGANISM: Artificial Sequence
<220> FEATURE:
<223> OTHER INFORMATION: scFv1168 LCDR1

<400> SEQUENCE: 64

Ser Ala Ser Ser Ser Val Ser Tyr Ile Tyr
1               5                   10

<210> SEQ ID NO 65
<211> LENGTH: 7
<212> TYPE: PRT
<213> ORGANISM: Artificial Sequence
<220> FEATURE:
<223> OTHER INFORMATION: scFv1168 LCDR2

<400> SEQUENCE: 65

Arg Thr Ser Asn Leu Ala Ser
1               5

<210> SEQ ID NO 66
<211> LENGTH: 9
<212> TYPE: PRT
<213> ORGANISM: Artificial Sequence
<220> FEATURE:
<223> OTHER INFORMATION: SCFV1168 LCDR3

<400> SEQUENCE: 66

Gln Gln Tyr His Thr Tyr Pro Leu Thr
1               5

<210> SEQ ID NO 67
<211> LENGTH: 7
<212> TYPE: PRT
<213> ORGANISM: Artificial Sequence
<220> FEATURE:
<223> OTHER INFORMATION: scFv1168 HCDR1

<400> SEQUENCE: 67

Gly Phe Thr Phe Ser Ser Phe
1               5

```
<210> SEQ ID NO 68
<211> LENGTH: 6
<212> TYPE: PRT
<213> ORGANISM: Artificial Sequence
<220> FEATURE:
<223> OTHER INFORMATION: scFv1168 HCDR2

<400> SEQUENCE: 68

Ser Ser Gly Ser Ser Thr
1               5

<210> SEQ ID NO 69
<211> LENGTH: 12
<212> TYPE: PRT
<213> ORGANISM: Artificial Sequence
<220> FEATURE:
<223> OTHER INFORMATION: scFv1168 HCDR3

<400> SEQUENCE: 69

Arg Pro Met Gly Gly Ala Gly Gly Ala Met Asp Tyr
1               5                   10

<210> SEQ ID NO 70
<211> LENGTH: 106
<212> TYPE: PRT
<213> ORGANISM: Artificial Sequence
<220> FEATURE:
<223> OTHER INFORMATION: scFv1168 light chain variable region

<400> SEQUENCE: 70

Gln Ile Val Leu Thr Gln Ser Pro Ala Ile Met Ser Ala Ser Pro Gly
1               5                   10                  15

Glu Lys Val Thr Ile Ser Cys Ser Ala Ser Ser Val Ser Tyr Ile
            20                  25                  30

Tyr Trp Tyr Gln Gln Lys Pro Gly Ser Ser Pro Lys Pro Trp Ile Tyr
            35                  40                  45

Arg Thr Ser Asn Leu Ala Ser Gly Val Pro Ala Arg Phe Ser Gly Ser
        50                  55                  60

Gly Ser Gly Thr Ser Tyr Ser Leu Thr Ile Ser Ser Met Glu Ala Glu
65                  70                  75                  80

Asp Ala Ala Ala Tyr Tyr Cys Gln Gln Tyr His Thr Tyr Pro Leu Thr
                85                  90                  95

Phe Gly Ala Gly Thr Lys Leu Glu Leu Lys
            100                 105

<210> SEQ ID NO 71
<211> LENGTH: 121
<212> TYPE: PRT
<213> ORGANISM: Artificial Sequence
<220> FEATURE:
<223> OTHER INFORMATION: scFv1168 heavy chain variable region

<400> SEQUENCE: 71

Asp Val Gln Leu Val Glu Ser Gly Gly Gly Leu Val Gln Pro Gly Gly
1               5                   10                  15

Ser Arg Lys Leu Ser Cys Ala Ala Ser Gly Phe Thr Phe Ser Ser Phe
            20                  25                  30

Gly Met His Trp Val Arg Gln Val Pro Glu Lys Gly Leu Glu Trp Val
            35                  40                  45

Ala Tyr Ile Ser Ser Gly Ser Ser Thr Ile Tyr Tyr Ala Asp Thr Val
        50                  55                  60

Lys Gly Arg Phe Thr Ile Ser Arg Asp Asn Pro Lys Asn Thr Leu Phe
```

```
                65                  70                  75                  80
Leu Gln Met Thr Ser Leu Arg Ser Glu Asp Thr Ala Met Tyr Tyr Cys
                    85                  90                  95

Ala Arg Arg Pro Met Gly Gly Ala Gly Gly Ala Met Asp Tyr Trp Gly
                    100                 105                 110

Gln Gly Thr Ser Val Thr Val Ser Ser
                    115                 120

<210> SEQ ID NO 72
<211> LENGTH: 490
<212> TYPE: PRT
<213> ORGANISM: Artificial Sequence
<220> FEATURE:
<223> OTHER INFORMATION: CAR 1168BBZ full length amino acid sequence

<400> SEQUENCE: 72

Met Glu Thr Asp Thr Leu Leu Leu Trp Val Leu Leu Leu Trp Val Pro
1               5                   10                  15

Gly Ser Thr Gly Thr Gly Gln Ile Val Leu Thr Gln Ser Pro Ala Ile
                20                  25                  30

Met Ser Ala Ser Pro Gly Glu Lys Val Thr Ile Ser Cys Ser Ala Ser
                35                  40                  45

Ser Ser Val Ser Tyr Ile Tyr Trp Tyr Gln Gln Lys Pro Gly Ser Ser
            50                  55                  60

Pro Lys Pro Trp Ile Tyr Arg Thr Ser Asn Leu Ala Ser Gly Val Pro
65                  70                  75                  80

Ala Arg Phe Ser Gly Ser Gly Ser Gly Thr Ser Tyr Ser Leu Thr Ile
                85                  90                  95

Ser Ser Met Glu Ala Glu Asp Ala Ala Ala Tyr Tyr Cys Gln Gln Tyr
                100                 105                 110

His Thr Tyr Pro Leu Thr Phe Gly Ala Gly Thr Lys Leu Glu Leu Lys
            115                 120                 125

Gly Gly Gly Gly Ser Gly Gly Gly Ser Gly Gly Gly Gly Ser Asp
            130                 135                 140

Val Gln Leu Val Glu Ser Gly Gly Gly Leu Val Gln Pro Gly Gly Ser
145                 150                 155                 160

Arg Lys Leu Ser Cys Ala Ala Ser Gly Phe Thr Phe Ser Ser Phe Gly
                165                 170                 175

Met His Trp Val Arg Gln Val Pro Glu Lys Gly Leu Glu Trp Val Ala
                180                 185                 190

Tyr Ile Ser Ser Gly Ser Ser Thr Ile Tyr Tyr Ala Asp Thr Val Lys
            195                 200                 205

Gly Arg Phe Thr Ile Ser Arg Asp Asn Pro Lys Asn Thr Leu Phe Leu
        210                 215                 220

Gln Met Thr Ser Leu Arg Ser Glu Asp Thr Ala Met Tyr Tyr Cys Ala
225                 230                 235                 240

Arg Arg Pro Met Gly Gly Ala Gly Gly Ala Met Asp Tyr Trp Gly Gln
                245                 250                 255

Gly Thr Ser Val Thr Val Ser Ser Ala Ala Ala Thr Thr Thr Pro Ala
                260                 265                 270

Pro Arg Pro Pro Thr Pro Ala Pro Thr Ile Ala Ser Gln Pro Leu Ser
            275                 280                 285

Leu Arg Pro Glu Ala Cys Arg Pro Ala Ala Gly Gly Ala Val His Thr
        290                 295                 300

Arg Gly Leu Asp Phe Ala Cys Asp Ile Tyr Ile Trp Ala Pro Leu Ala
```

```
                    305                 310                 315                 320
Gly Thr Cys Gly Val Leu Leu Ser Leu Val Ile Thr Leu Tyr Cys
                325                 330                 335
Lys Arg Gly Arg Lys Lys Leu Leu Tyr Ile Phe Lys Gln Pro Phe Met
            340                 345                 350
Arg Pro Val Gln Thr Thr Gln Glu Glu Asp Gly Cys Ser Cys Arg Phe
                355                 360                 365
Pro Glu Glu Glu Glu Gly Gly Cys Glu Leu Arg Val Lys Phe Ser Arg
        370                 375                 380
Ser Ala Asp Ala Pro Ala Tyr Gln Gln Gly Gln Asn Gln Leu Tyr Asn
385                 390                 395                 400
Glu Leu Asn Leu Gly Arg Arg Glu Glu Tyr Asp Val Leu Asp Lys Arg
                405                 410                 415
Arg Gly Arg Asp Pro Glu Met Gly Gly Lys Pro Arg Arg Lys Asn Pro
            420                 425                 430
Gln Glu Gly Leu Tyr Asn Glu Leu Gln Lys Asp Lys Met Ala Glu Ala
                435                 440                 445
Tyr Ser Glu Ile Gly Met Lys Gly Glu Arg Arg Arg Gly Lys Gly His
    450                 455                 460
Asp Gly Leu Tyr Gln Gly Leu Ser Thr Ala Thr Lys Asp Thr Tyr Asp
465                 470                 475                 480
Ala Leu His Met Gln Ala Leu Pro Pro Arg
                485                 490

<210> SEQ ID NO 73
<211> LENGTH: 1473
<212> TYPE: DNA
<213> ORGANISM: Artificial Sequence
<220> FEATURE:
<223> OTHER INFORMATION: CAR 1168BBZ full length nucleotide sequence

<400> SEQUENCE: 73
atggagaccg acaccctctt attatgggtg ctgttattat gggtccccgg aagcaccgga        60
accggtcaga ttgtgctgac ccagagcccc gctatcatga gcgcctcccc cggcgagaag       120
gtgaccatca gctgctccgc cagcagcagc gtgagctaca tctactggta ccagcagaag       180
cctggaagca gccccaagcc ttggatctat agaacatcca atctggccag cggcgtgccc       240
gccagattta gcggctccgg cagcggcaca tcctactctc tgacaatcag ctccatggag       300
gctgaagatg ccgccgccta ctattgccag cagtaccaca cctaccctct gacatttggc       360
gccggcacca agctggagct caaaggcggc ggaggaagcg aggaggagg cagcggagga       420
ggcggaagcg atgtgcagct ggtggaatcc ggaggcggac tggtgcaacc cggcggctct       480
aggaagctga gctgcgctgc cagcggcttc accttctcct ccttcggcat gcactgggtg       540
agacaagtgc ccgagaaagg actggagtgg gtggcctaca tctcctccgg cagctccacc       600
atctactacg ccgacaccgt caagggaaga ttcaccatct ctagggacaa ccccaagaac       660
acactgtttc tgcagatgac atctctgaga gcgaggaca cagccatgta ctactgcgcc       720
agaagaccta tgggcggagc tggcggcgcc atggattact ggggacaagg cacctccgtg       780
accgtgtcca gcgcggccgc aactacaact ccagctccac gaccaccaac acctgctcca       840
accatcgctt cgcagcctct gtccctgcgc ccagaggcat gccggccagc tgcaggaggt       900
gcagtgcaca cgagggggct ggacttcgcc tgtgatatct acatctgggc gcccttggcc       960
gggacttgtg gggtccttct cctgtcactg gttatcaccc tttactgcaa acggggcaga      1020
```

| | | | | |
|---|---|---|---|---|
| aagaaactcc | tgtatatatt | caaacaacca | tttatgagac | cagtacaaac tactcaagag | 1080 |
| gaagatggct | gtagctgccg | atttccagaa | gaagaagaag | gaggatgtga actgagagtg | 1140 |
| aagttcagca | ggagcgcaga | cgcccccgcg | taccagcagg | gccagaacca gctctataac | 1200 |
| gagctcaatc | taggacgaag | agaggagtac | gatgttttgg | acaagagacg tggccgggac | 1260 |
| cctgagatgg | ggggaaagcc | gagaaggaag | aaccctcagg | aaggcctgta caatgaactg | 1320 |
| cagaaagata | agatggcgga | ggcctacagt | gagattggga | tgaaaggcga gcgccggagg | 1380 |
| ggcaaggggc | acgatggcct | ttaccagggt | ctcagtacag | ccaccaagga cacctacgac | 1440 |
| gcccttcaca | tgcaggccct | gccccctcgg | taa | | 1473 |